United States Patent [19]

Sakamoto et al.

[11] Patent Number: 4,894,909
[45] Date of Patent: Jan. 23, 1990

[54] APPARATUS FOR ASSEMBLING WHEEL ATTACHING UNIT FOR USE IN VEHICLE ASSEMBLY LINE

[75] Inventors: Shunji Sakamoto; Hisaaki Katsuki, both of Hiroshima; Junichi Usui; Haruo Oda, both of Osaka; Tsuyoshi Watanabe, Hiroshima, all of Japan

[73] Assignee: Mazda Motor Corp., Hiroshima, Japan

[21] Appl. No.: 263,425

[22] Filed: Oct. 27, 1988

[30] Foreign Application Priority Data

Oct. 28, 1987 [JP] Japan .................................. 62-272340
Oct. 29, 1987 [JP] Japan .................................. 62-274485
Oct. 30, 1987 [JP] Japan .................................. 62-276859
Feb. 22, 1988 [JP] Japan .................................. 63-38919

[51] Int. Cl.⁴ ........................................... B23P 19/00
[52] U.S. Cl. ...................................... 29/719; 29/784; 29/799; 29/802; 29/824
[58] Field of Search ................. 29/469, 559, 700, 719, 29/784, 799, 802, 822, 823, 824; 104/290, 291, 292, 293, 294; 198/619

[56] References Cited

U.S. PATENT DOCUMENTS

| 4,589,184 | 5/1986 | Asano et al. | 29/559 X |
| 4,589,199 | 5/1986 | Ohtaki et al. | 29/559 X |
| 4,690,066 | 9/1987 | Morishita et al. | 104/293 X |
| 4,723,356 | 2/1988 | Sakamoto et al. | 29/824 X |
| 4,734,979 | 4/1988 | Sakamoto et al. | 29/822 |
| 4,738,022 | 4/1988 | Sakamoto et al. | 29/711 X |
| 4,742,778 | 5/1988 | Morishita et al. | 104/291 X |
| 4,796,346 | 1/1989 | Kawasaki et al. | 29/700 |
| 4,811,667 | 3/1989 | Morishita et al. | 104/293 X |

FOREIGN PATENT DOCUMENTS

| 3150476A | 12/1981 | Fed. Rep. of Germany. | |
| 56-103665 | 9/1981 | Japan. | |
| 59-124471 | 8/1984 | Japan. | |
| 1229108 | 5/1986 | U.S.S.R. | 29/802 |

Primary Examiner—Timothy V. Eley
Assistant Examiner—Frances Chin
Attorney, Agent, or Firm—Webb, Burden, Ziesenheim & Webb

[57] ABSTRACT

An apparatus for assembling a wheel attaching unit for use in a vehicle assembly line having a pallet capable of mounting at predetermined positions thereof a front assembly including a front wheel attaching unit and a rear assembly including a rear wheel attaching unit; a pallet conveyor for conveying the pallet through a setting area and a securing area of the front and rear units and a body; and a body conveyor for conveying the body to a position above the setting area and for lowering the body to set the front and rear assemblies to the body. The pallet includes a holding portion for the front assembly and/or a holding portion for the rear assembly with the holding portion being position adjustable in forward and rearward directions thereof.

19 Claims, 21 Drawing Sheets

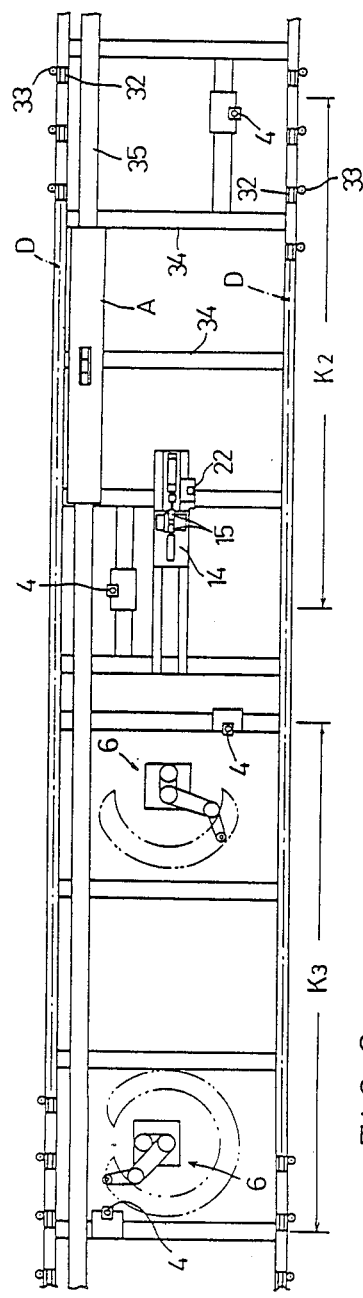
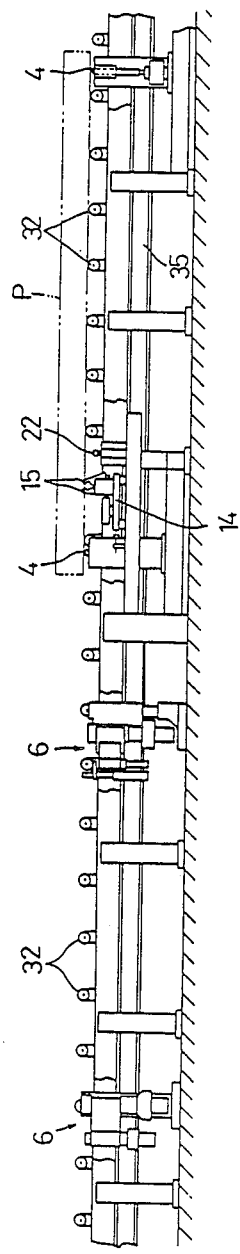
FIG.7
FIG.8

FIG. 16
(a)
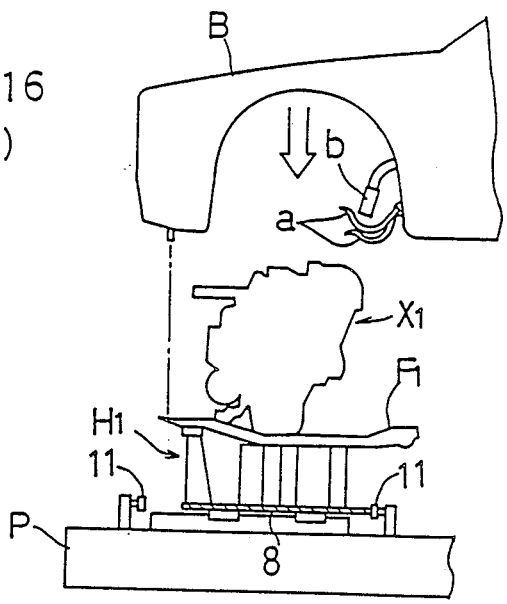
(b)
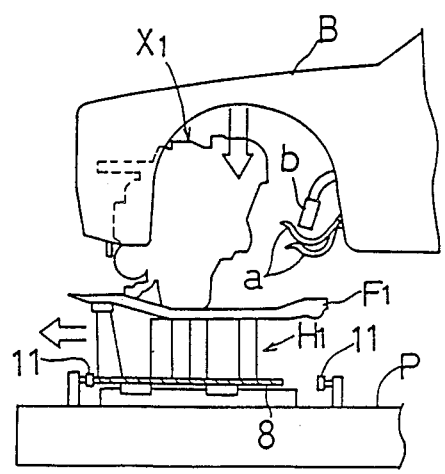
(c)
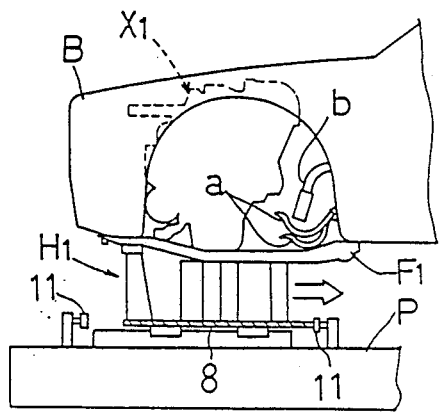

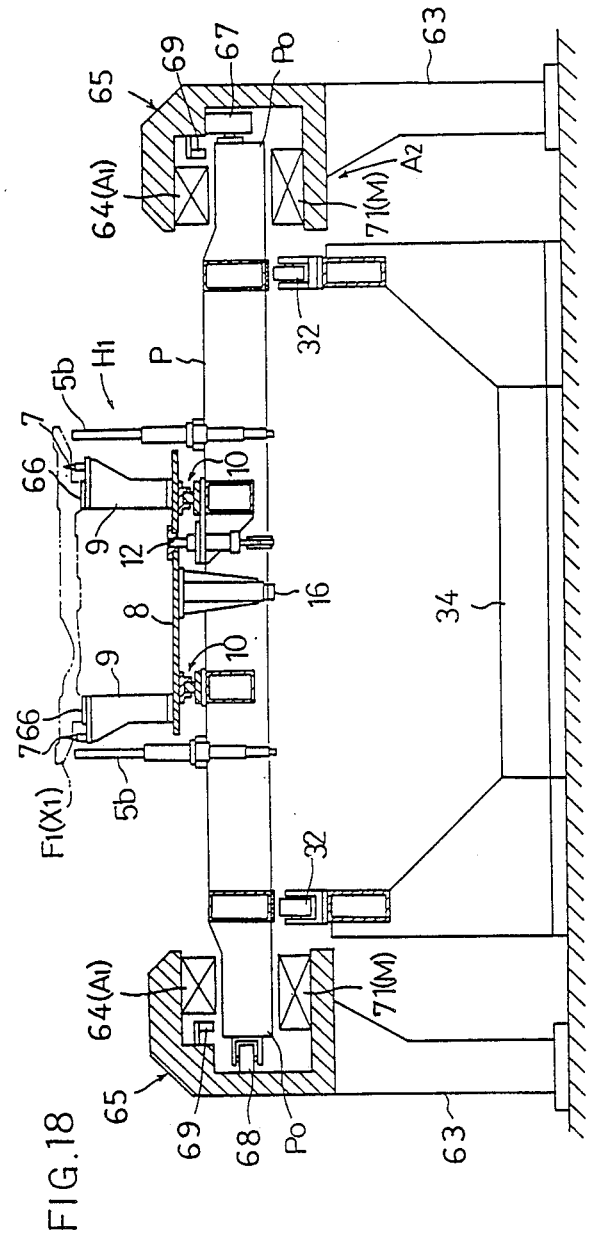
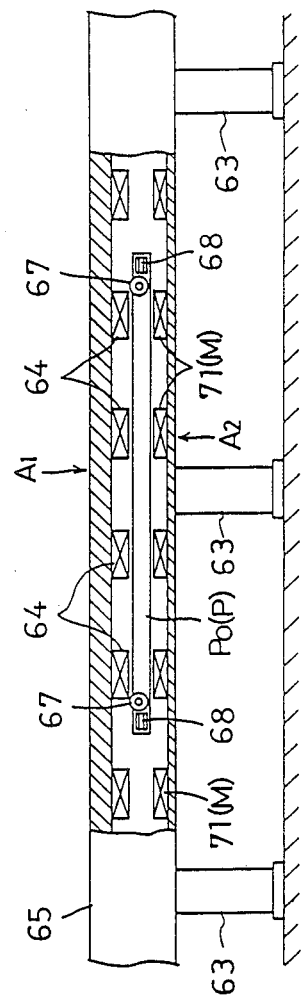
FIG.18
FIG.19

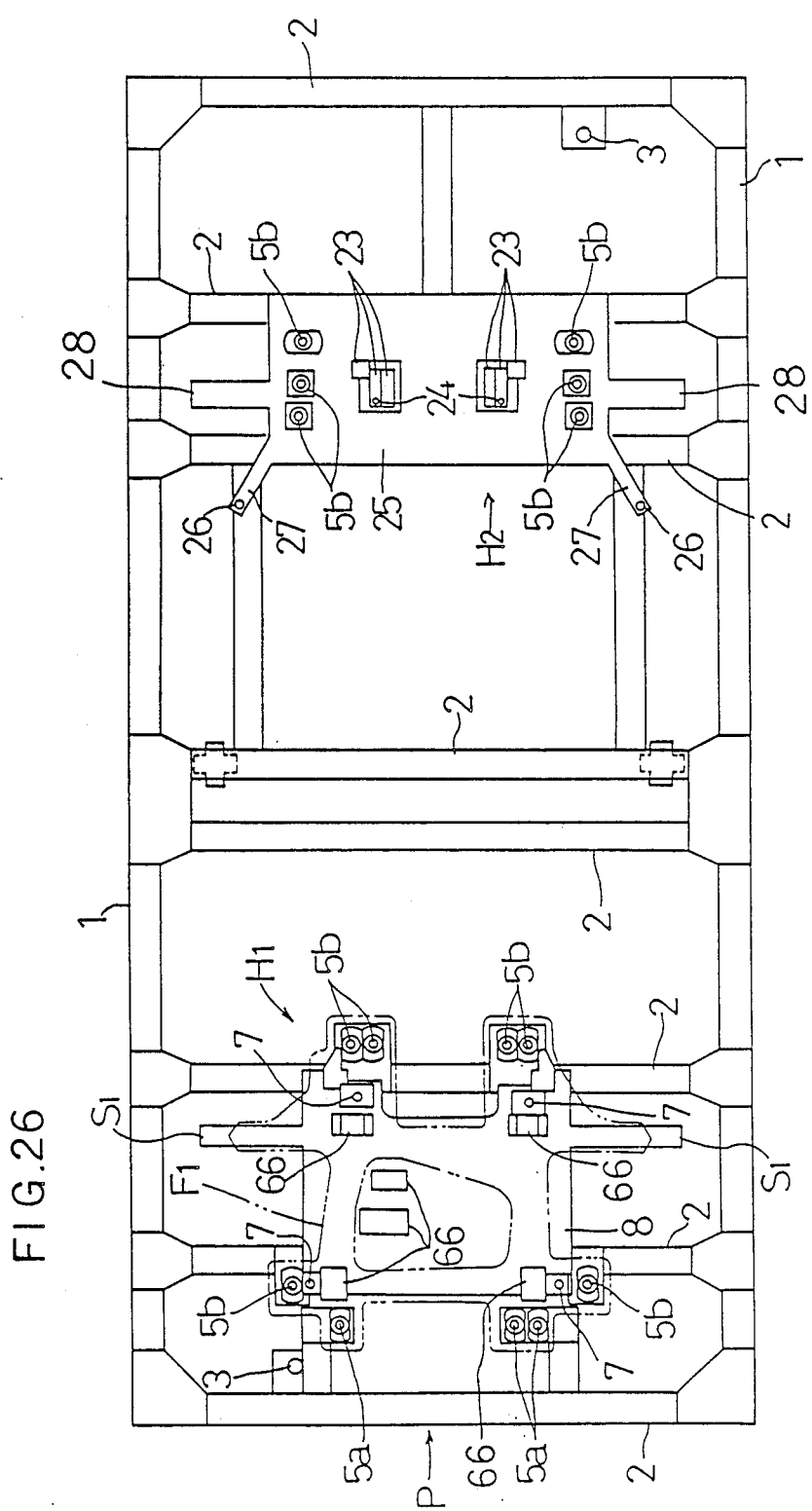

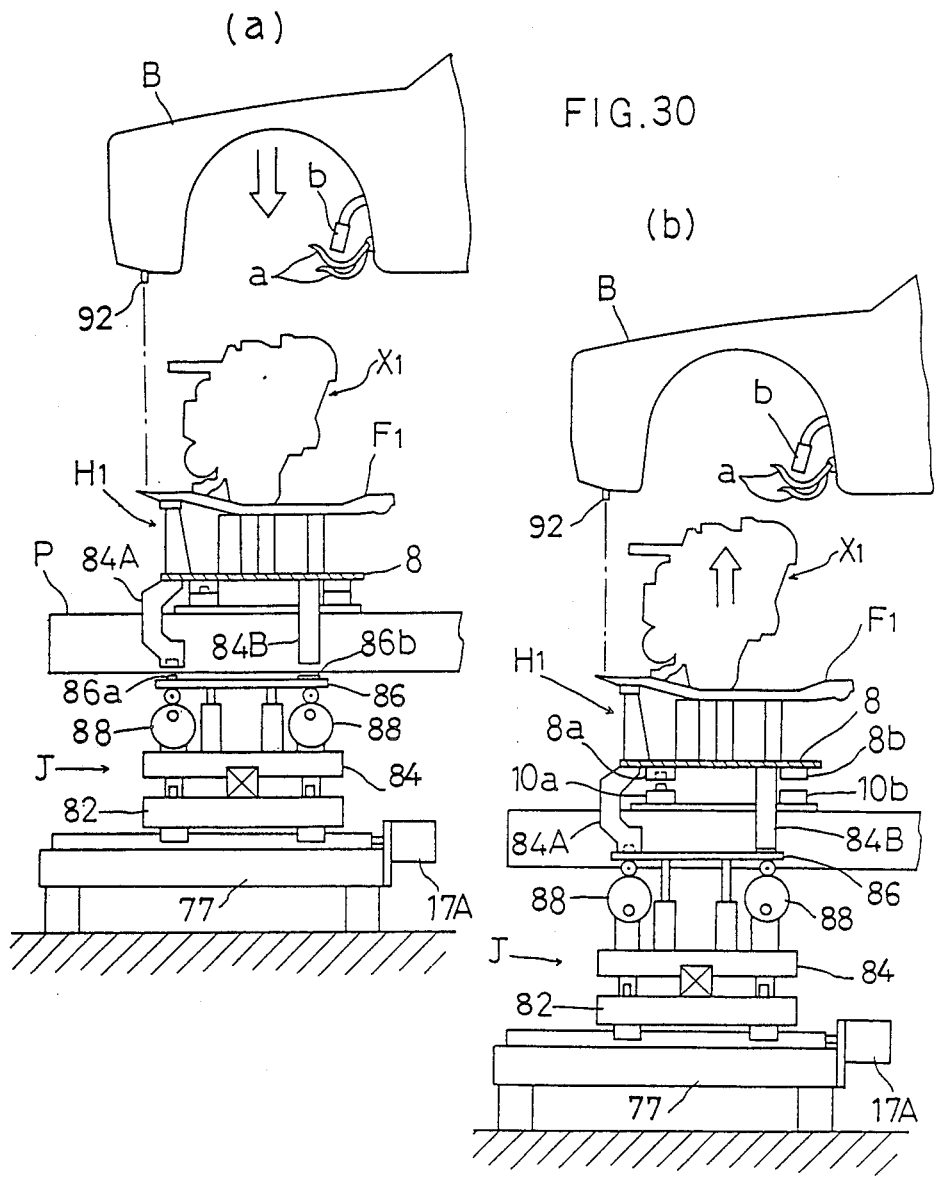

(C)

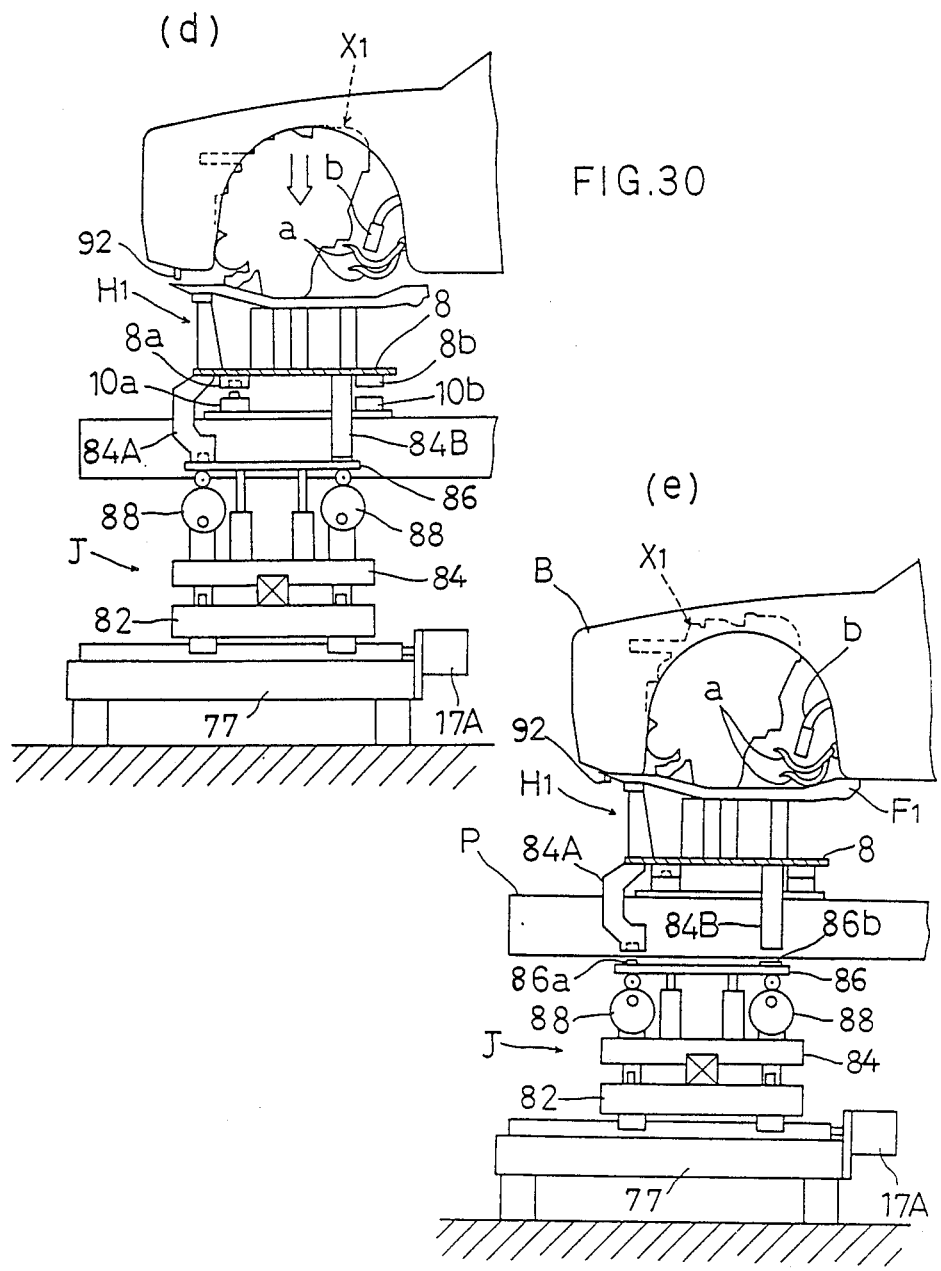

APPARATUS FOR ASSEMBLING WHEEL ATTACHING UNIT FOR USE IN VEHICLE ASSEMBLY LINE

BACKGROUND OF THE INVENTION

(1) FIELD OF THE INVENTION

The present invention relates to an apparatus for assembling a wheel attaching unit for use in a vehicle assembly line.

(2) DESCRIPTION OF THE PRIOR ART

With an apparatus of the above-described type for assembling a wheel attaching unit for use in a vehicle assembly line, a pallet mounting thereon a front assembly and a rear assembly is stopped at a setting area, where the front and rear assemblies are set to the body with the body being lowered from above the setting area onto the pallet.

After the above setting operation, the body and the front and rear assemblies are securely fixed to each other by means of such securing elements as bolt-nuts. Although these securing operations may be carried out at the setting area, it is more common to carry out the same by conveying the pallet further to a securing area provided at a more downstream side in the conveying direction than the setting area.

As is well-known, a wheel-base often differs from one type of vehicle to another. In order to cope with this problem, it is conceivable to provide a plurality of kinds of pallets. That is, it is possible to adapt these pallets to mount the front assembly and the rear assembly with different interdistances respectively.

However, it is very cost-disadvantageous to provide such plurality of pallets for different wheel-bases.

According to further prior art relating to this field (e.g. a Japanese laid-open patent gazette No. 56-103665, a pallet to which a wheel attaching unit is preliminarily set and a vehicle body carried by a further conveyor means are transported in synchronism with each other while the wheel attaching unit is being set to the body from the underside of the pallet.

With this prior-art method which attempts to automatically set the wheel attaching unit to the body from under the pallet, there arises the problem that the synchronized transportations of the pallet and the body must be effected with high precision.

SUMMARY OF THE INVENTION

With view of the above-described state of the art, the primary object of the present invention is to provide an apparatus for assembling a wheel attaching unit for use in a vehicle assembly line, the apparatus enabling assembly of the wheel attaching unit to vehicle bodies of different wheel-bases with one type of pallet alone.

In order to accomplish the above-noted object, according to the apparatus according to the present invention, there is provided a pallet capable of mounting a front assembly including a front wheel attaching unit at a holding portion and a rear assembly including a rear wheel attaching unit at a further holding portion, the holding portions being position adjustable in forward and rearward directions thereof.

Functions and effects of the above characterizing feature will be described next.

With the above feature, by adjusting the forward rearward position of either of the holding portions respectively for the front assembly and the rear assembly, the wheel attaching unit may be set to vehicle bodies of different wheel-bases with a single pallet. As the result, since only one type of pallet is needed for setting the wheel attaching unit to bodies of different wheel-bases, it has become possible to simplify the installation and to reduce the installation costs as well.

BRIEF DESCRIPTION OF THE DRAWINGS

The accompanying drawings illustrate preferred embodiments of an apparatus related to the present invention for an apparatus for assembling a wheel attaching unit for use in a vehicle assembly line; in which, FIG. 7 is a plane view showing portions of the wheel attaching unit assembly line, FIG. 8 is a partially cut-out side view showing of FIG. 7, FIG. 11 is a partially cut-out side view of a moving member, FIG. 12 is a front view of the moving member, FIGS. 16(a), 16(b) and 16(c) are schematic side views illustrating setting operations, FIG. 18 is a partially cut-out front view illustrating a conveying condition of the pallet related to an alternate embodiment of the present invention, FIG. 19 is a partially cut-out side view showing a magnetic-floating construction for use in the conveying operation illustrated in FIG. 18, FIG. 26 is a plane view of a pallet of the embodiment of FIG. 23.

DESCRIPTION OF THE PREFERRED EMBODIMENTS

Preferred embodiments of an apparatus related to the present invention for assembling a wheel attaching unit for use in a vehicle assembly line will be detailed hereinafter with reference to the accompanying drawings.

Figure 2:
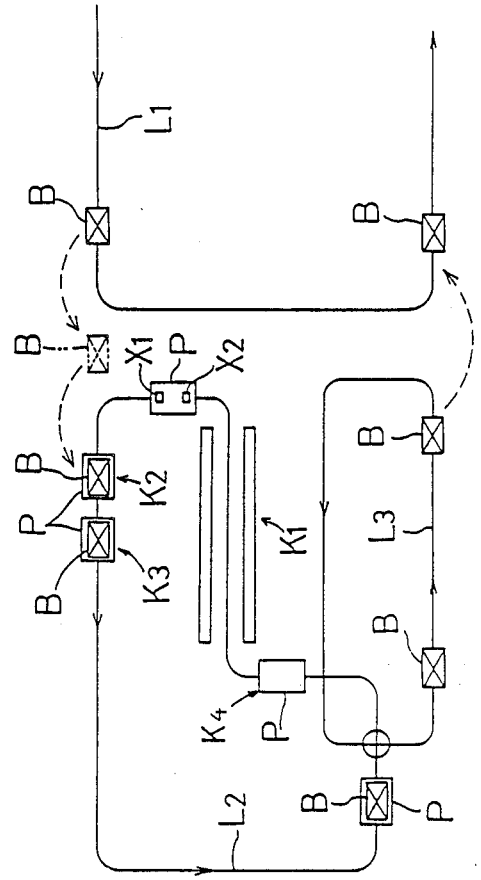
FIG. 2 is a schematic plane view of the entire assembly line.
Figure 3:
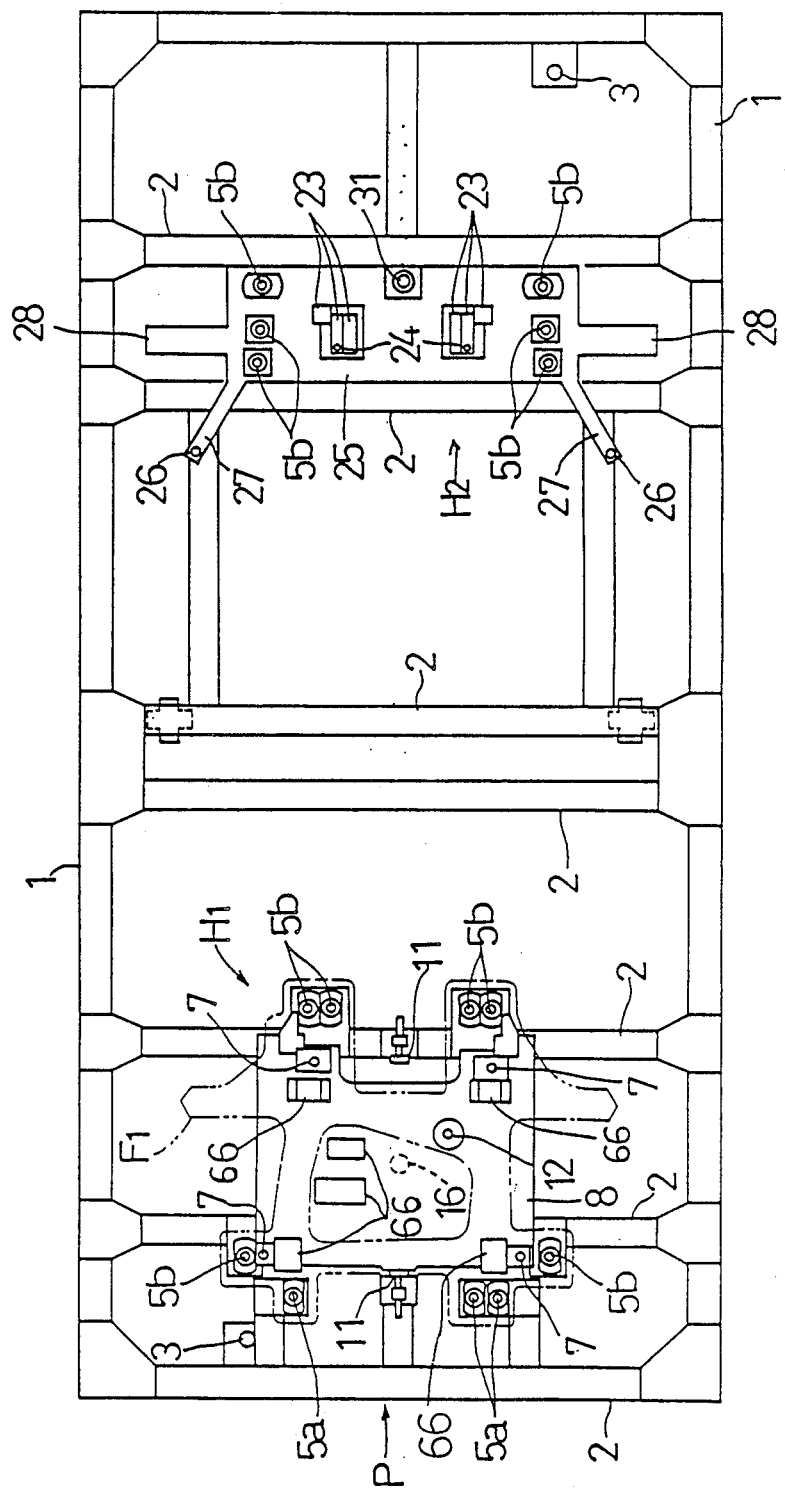
FIG. 3 is a plane view of a pallet.

First, a vehicle assembly line will be shortly described with reference to FIG. 2.

The vehicle assembly line includes a main line L1 constituted by e.g. an overhead conveyor, a sub line L2 having a pallet P and a relay line L3 constituted by e.g. an overhead conveyor.

In operation, a vehicle body B is conveyed from an intermediate portion of the main line L1 to the sub line L2, where an engine, the wheel attaching unit, driver's and passengers' seats, tires, an exhaust relating unit and so on are set to the body B. This body B is again conveyed via the relay line L3 to the main line L1, where final setting operations are effected on the body B.

On the sub line L2, the pallet P mounts at fixedly predetermined positions thereof a front assembly X1 having the engine and a front wheel attaching unit and a rear assembly X2 having a rear wheel attaching unit and an unillustrated oil tank, exhaust pipe, silencer, electric cables and so on. Needless to say, this sub line L2 includes a mechanism for conveying the pallet P.

Referring more particularly to the operation of the above assembly line, first at a parts supply area K1, the front and rear assemblies X1 and X2, oil tank, exhaust pipe, silencer, electric cables and so on are mounted on the pallet P. Second, this pallet P is conveyed to a setting area K2, where the assemblies X1, X2 are set to the body B. Third, the pallet P is further conveyed to a securing area K3, where the assemblies X1 and X2, oil tank, exhaust pipe, silencer, cables and so on are fixedly secured to the body B. In the subsequent processes which will not be detailed here, the seats, tires and the like are fixedly set to the body B while the pallet P is being conveyed.

A reference mark K4 denotes a pallet adjusting area where the pallet P is adjusted in accordance with a particular wheel-base which differs from one vehicle to another.

About the above areas and constructions, the setting operations of the front and rear assemblies X1, X2 and the body B and the securing operations effected between the set assemblies X1 and X2 and the body B will be more particularly described next. Incidentally, where the front and rear assemblies X1 and X2 are illustrated in the accompanying drawings, a suspension unit and the like are omitted from the views depending on the necessity.

Incidentally, the settings and securings of the oil tank, exhaust pipe, silencer, electric cables and so on are not illustrated in the drawings but will be briefly described when necessary.

As shown in FIGS. 3 through 6, the pallet P essentially comprises a grating-like structure consisting of a left and right pair of longitudinal frames 1 and of a plurality of transverse frames 2 aligned in parallel with each other in the longitudinal direction.

The pallet P includes a holding portion H1 for the front assembly X1 at a forward portion thereof and a further holding portion H2 for the rear assembly X2 at a rear portion thereof. Needless to say, the pallet P further includes other holding portions for the oil tank, exhaust pipe, silencer and so on. For instance, there is provided a holding portion for the oil tank forwardly of the rear assembly holding portion H2, and the other holding portions are provided at positions corresponding to the set positions of the respective parts.

The pallet P is to be fixedly positioned at e.g. the setting area K2 and the securing area K3. For this reason, the pallet P defines pin engaging holes 3 at front end portions and rear end portions thereof. On the other hand, at the predetermined positions in the setting area K2 and the securing area K3 where the pallet P is to be fixedly positioned as shown in FIGS. 7 and 8, there are provided lock pins 4 which are lifted up and down by means of air cylinders for engagement with and disengagement from the pin engaging holes 3.

Figure 10:
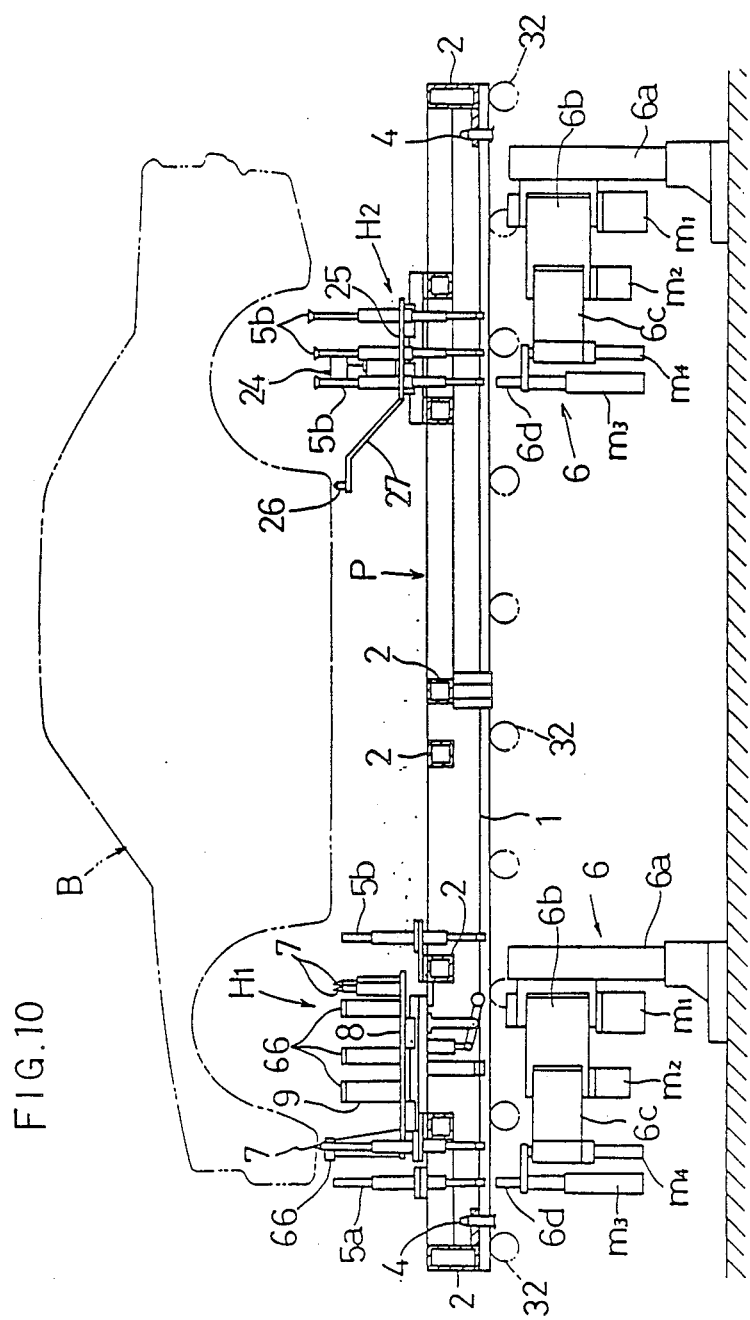
FIG. 10 is a side view illustrating a condition where the pallet is placed at its securing area.

The pallet P further mounts at forward and rearward portions thereof a nut holder 5a and a bolt holder 5b acting together with as securing member holding means, with the holders 5a and 5b being vertically movable and pivotable about vertical axes also. In operation, these holders 5a and 5b are vertically moved and pivoted to fixedly secure the front and rear assemblies X1 and X2, oil tank, exhaust pipe, silencer, cables and so on to the body B at the securing area K2. Therefore, the body B includes bolts and nuts corresponding to the nuts and bolts held by the holders 5a and 5b. Further, at the securing area K3 as shown in FIG. 10 in details, a forward and rearward pair of holder operating robots 6 acting as securing means are provided.

Each holder operating robot 6 includes a base 6a, a first arm 6b pivotable about a vertical axis relative to the base by an actuator m1, a second arm 6c pivotable about a vertical axis by an actuator m2 and an operational member 6d pivotable by an actuator m3 and liftable relative to the second arm 6c by an actuator m4. In operation, as the operational member 6d is brought into engagement with lower ends of the respective holders 5a, 5b, the holders 5a and 5b are vertically moved and pivoted. Also, each robot 6 is controlled by an unillustrated controller so as to operate the plurality of holders 5a and 5b in a predetermined sequence. Although this robot 6 may serve also to fixedly secure the oil tank, exhaust pipe, silencer, electric cables and so on, it is also possible to provide other robots to effect the same if necessary.

For fixedly mounting the front assembly X1, the front assembly holding portion H1 includes a plurality of receiving members 66 for receiving a base frame F1 of the front assembly X1 and a plurality of positioning pins 7 which come into engagement with the base frame F1 from the underside thereof. The groups of the receiving members 66 and the engaging pins 7 are supported by cylindrical members 9 projected from a base plate member 8. Incidentally, each cylindrical member 9 may support both the receiving member 66 and the engaging pin 7 or support only either of the same.

Further, the base plate member 8 is supported by a right and left pair of slide rails 10 so as to be movable in the forward and rearward directions. Accordingly, the front assembly holding portion H1 is positionally adjustable in the forward and rearward directions.

A reference numeral 11 denotes a stopper which comes into contact with the base plate member 8 in order to regulate the forward and rearward moving range of the front assembly holding portion H1. A reference numeral 12 denotes a lock pin which comes into engagement with the base plate member 8 from its underside in order to fixedly place the front assembly holding portion H1 at a predetermined position.

In this particular embodiment, the front assembly holding portion H1 is automatically moved in the forward and rearward directions at the setting area K2, and the lock pin 12 is engaged or disengaged in relation to the forward and rearward movements of the holding portion H1.

Figure 9:
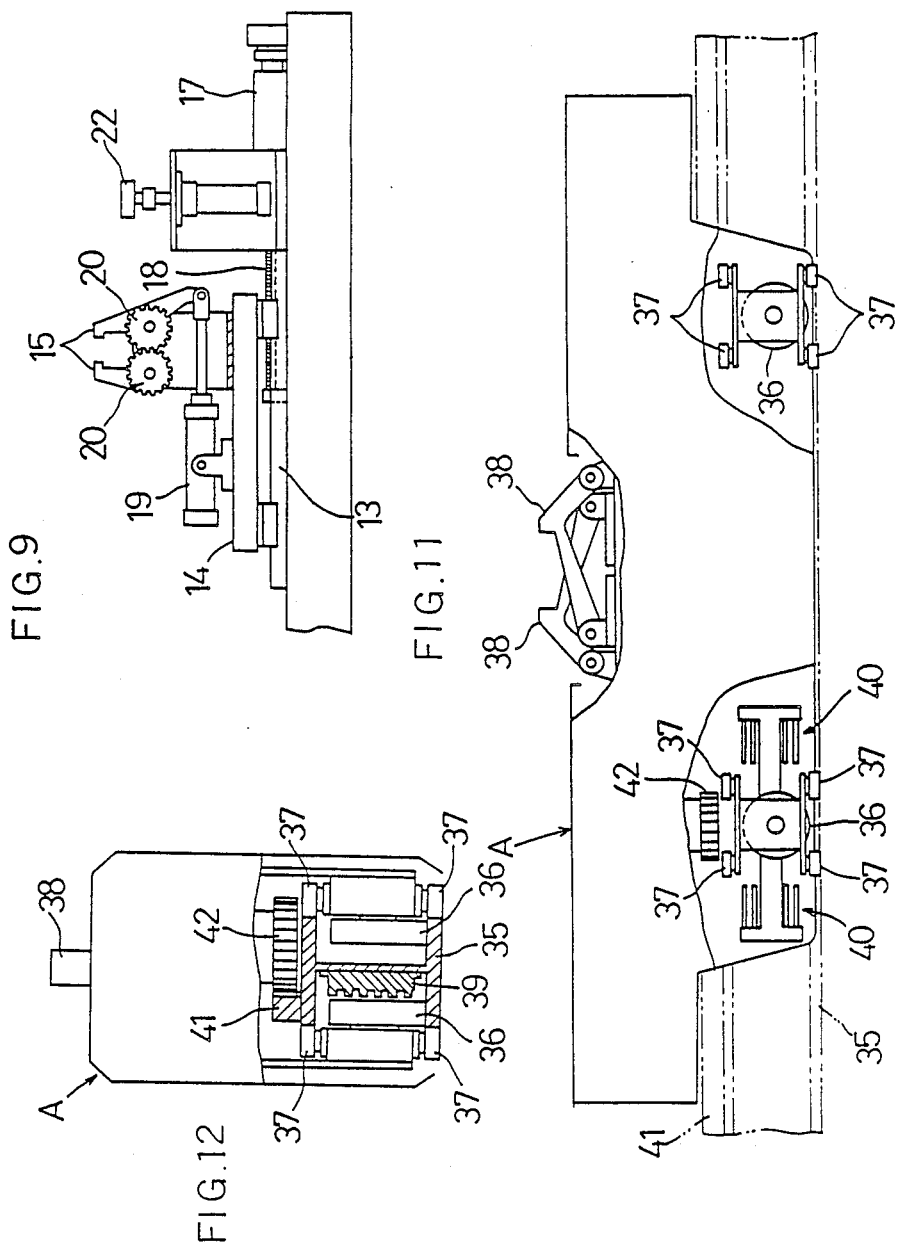
FIG. 9 is a side view illustrating a forward-rearward position adjustment construction.

More specifically, as shown in FIG. 9, at the setting area K2 there is provided a movable member 14 slidable along the right and left pair of guide rails 13. This movable member 14 includes a forward and rearward pair of stopper elements 15 for stopping elements 16 attached to the base plate member 8.

The movable member 14 includes an unillustrated dowel-like element for engagement with a screw shaft 18 driven by an electric motor 17 for pallet moving operations, such that the movable member 14 slides in the forward and rearward directions by normal and reverse rotations of the electric motor 17.

The pair of stopper elements 15 are switched over between a stopping condition and a stopping-release condition through vertical pivot movements thereof about horizontal axes effected by a single air cylinder 19. That is to say, this air cylinder 19 is operatively connected with one of the stopper elements 15 and is also engageable with a pair of gears 20 rotatable in unison with the respective stopper elements 15.

Figure 4:
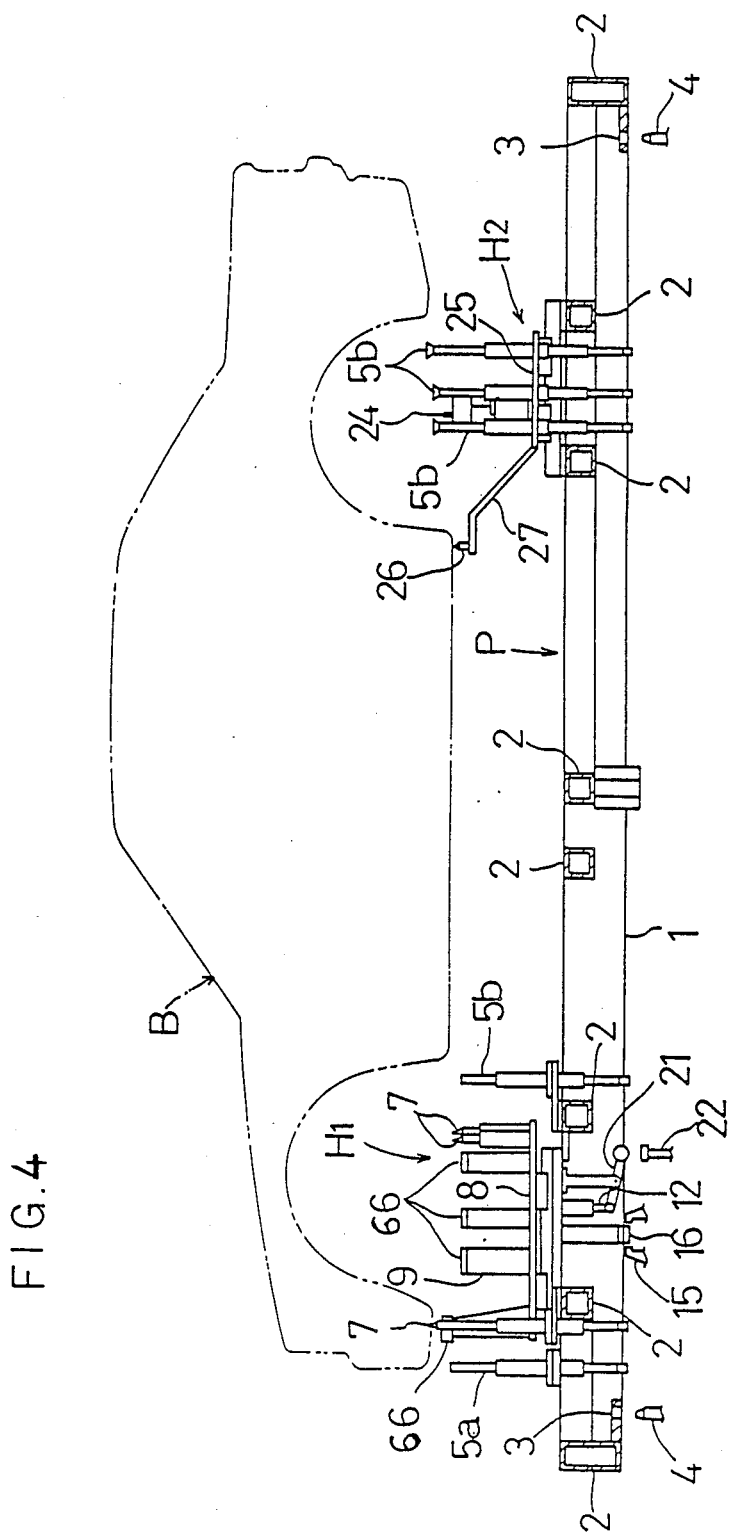
FIG. 4 is a partially cut-out side view of the pallet.

The lock pin 12, as shown in FIG. 4, is urged towards its engagement side by a spring and is disengageable by a release lever 21. Thus, at the setting area K2, there is further provided an air cylinder 22 for depressing the release lever 21.

Incidentally, the above-described forward and rearward movements of the front assembly holding portion H1 are effected in order to avoid mutual interferences between the body side members and the front assembly X1. These operations will be more particularly described later.

Similarly to the front assembly holding portion H1, the rear assembly holding portion H2 includes, for fixedly mounting the rear assembly X2, a plurality of receiving members 23 for receiving a base frame F2 of the rear assembly X2 and a plurality of positioning pins 24 which come into engagement with the base frame F2 from the underside thereof. The groups of the receiving members 23 and the engaging pins 24 are supported by cylindrical members 26 projected from a base plate member 25 which is a holding portion side member.

Incidentally, the plurality of receiving members 23 and the engaging pins 24 are selectively employed depending on the vehicle driving method such as four-wheel drive or two-wheel drive and also on the vehicle steering method such as two-wheel steering or four-wheel steering. Although specific arrangements for the selective uses will not be described here, it is possible to adapt some of the cylindrical members 26 to be height adjustable such that unnecessary ones may be receded downwardly.

Also, while the nut and bolt holders 5a to be attached to the front portions of the pallet in accordance with the front assembly X1 are attached to the pallet P per se, the nut and bolt holders 5b to be attached to the rear portions of the pallet in accordance with the rear assembly X2 are attached to the base plate member 25. Also, some of these holders 5b attached to the base plate member 25 are position adjustable depending on a particular vehicle drive system and vehicle steering system.

Further, the base plate member 25 continuously forms a support bracket 27 for supporting the engaging pins 26 coming into engagement with the body B from its under side and a receiving element 28 for receiving and supporting a rear wheel.

For coping with the various wheel-bases different from one type of vehicle to another, the rear assembly holding portion H2 is attached to the pallet P with the holding portion H2 being positionally adjustable in the forward and rearward directions.

More specifically, the base plate member 25 is supported on a left and right pair of slide rails 29 so as to be slidable in the forward and rearward directions. The base plate member 25 includes an engaging pin 31 selectively engageable from its upper side with a front and rear pair of engaging holes defined in an engaging member 30 attached to the pallet P. Accordingly, through this selective engagement of the pin 31, the rear assembly holding portion H2 may be placed at either of the front and rear positions. The base plate member 25 acts as a holding portion side member for setting the holder 5b and movable in unison with the rear assembly holding portion H2.

Also, the engaging pin 31 is elastically urged downwardly, i.e. towards its engagement side and is disengaged by being pulled against the urging force.

Figure 1:
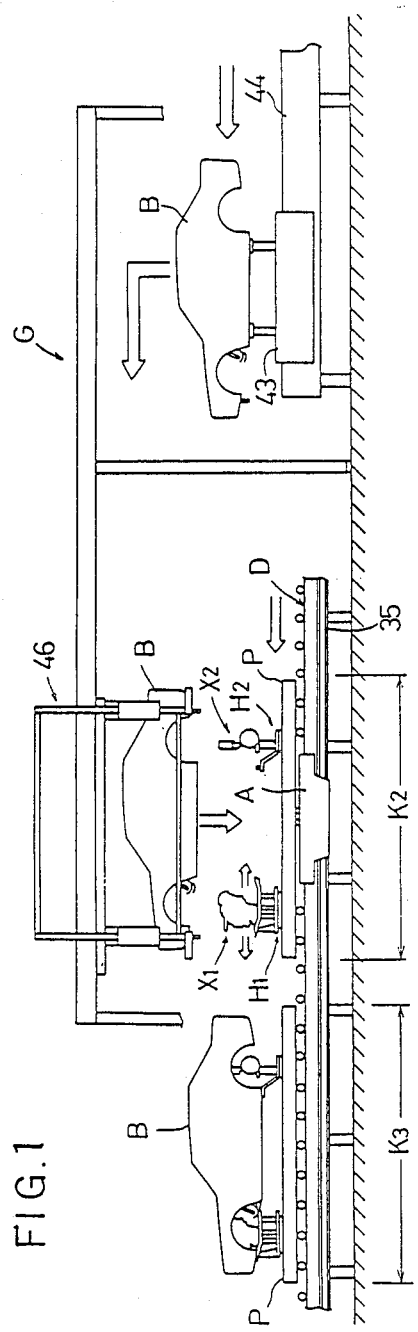
FIG. 1 is a schematic side view showing portions of a wheel attaching unit assembly line.
Figure 5:
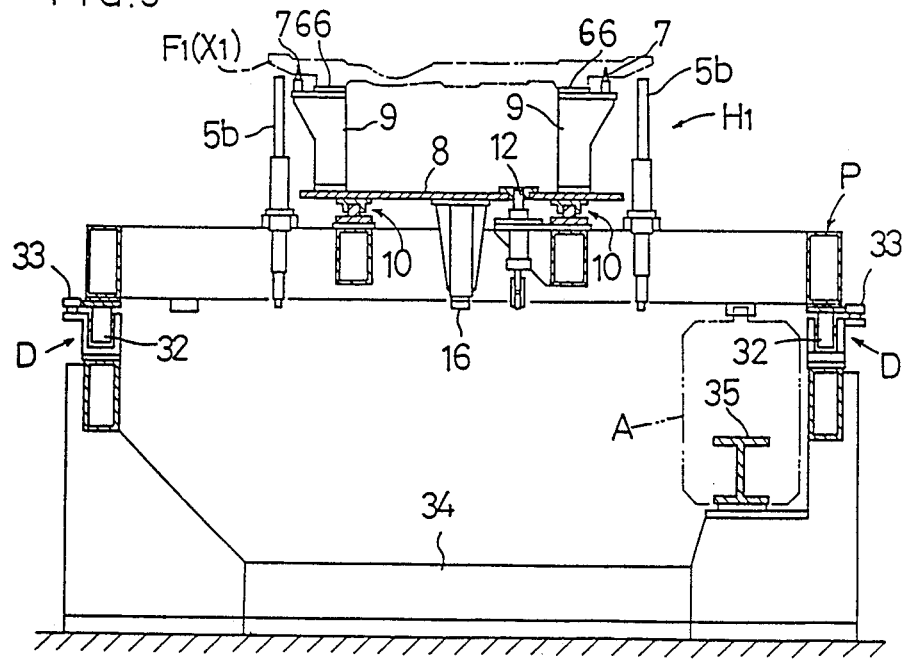
FIG. 5 is a partially cut-out front view of a front assembly holding portion.
Figure 6:
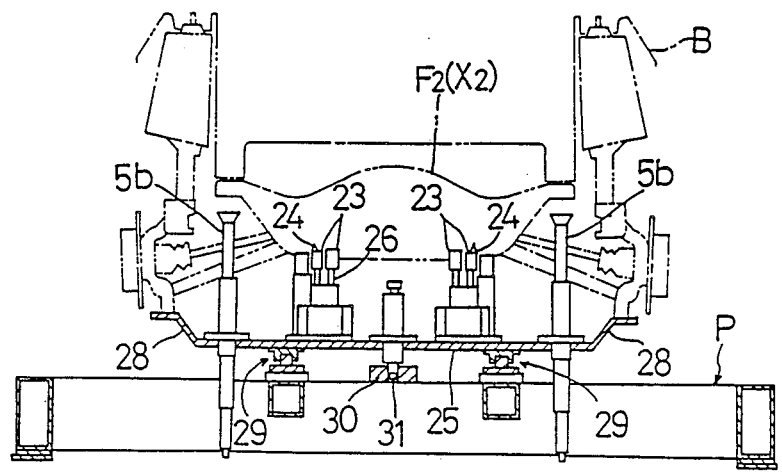
FIG. 6 is a partially cut-out back view of a rear assembly holding portion.

As shown in FIG. 1 and FIG. 5, pallet conveyor means includes a roller conveyor device extending over an entire length of the sub line L2 and a moving member A for moving and stopping the pallet P.

The roller conveyor device includes a right and left pair of conveyor portions D, each portion D having a receiving roller 32 rotated about a horizontal axis and a horizontal movement regulating roller 33 rotated about a vertical axis. Accordingly, the pallet P is moved along the line as its right and left ends being received and guided by these rollers 32 and 33.

A reference numeral 34 denotes a conveyor frame with an inverted 'U' shape, a plurality of which are provided with an appropriate interdistance therebetween along the line. Also, these conveyor frames 34 are utilized also as bases for setting various vehicle parts.

As also shown in FIG. 11 and FIG. 12, the moving member A travels along a guide 35 having an 'I' shaped vertical cross section. More particularly, the moving member A includes a right and left pair of travelling wheels 36 and eight centering rollers 37, with the travelling wheels 36 being driven by an unillustrated electric motor for propelling the moving member A.

Further, the moving member A mounts on its upper face a pair of stopper elements 38 for stopping the pallet P, the stopper elements 38 being vertically pivotable so as to stop the pallet P with its upward pivotal movement and to release the pallet P with its downward pivotal movement. Although not described in details, these pivoting operations of the stopper elements 38 are effected by using cam elements slided by an electric motor.

To a side face of the guide 35, there is attached a power-supply rail 39 for supplying and receiving electric power and control signals. On the other hand, the moving member A mounts a collector unit 40. Also, the guide 35 mounts on an upper face thereof a rack 41, and the moving member A includes a pinion 42 engageable with the rack 41 and an unillustrated rotary encoder for detecting a rotational amount of the pinion 42. With these arrangements togetherwith, the travelling speed and distance of this moving member A may be detected.

Incidentally, the above moving member A is provided in plurality with being disposed at positions on the sub line L2, such that these moving members A convey the pallet P in sequence. That is, the moving members A are controlled to move back and forth within a predetermined distance. More specifically, after conveying the pallet P from the start position to the end position, the moving member A travels back to the start position.

Also, a pair of the opposed moving members A adjacent to each other in the line longitudinal direction are displaced from each other in the line width direction such that one member may engage a left side portion of the pallet P while the other member may engage a right side portion of the same. Accordingly, interferences between these opposed adjacent moving members A may be advantageously avoided.

Referring back to FIG. 1, the body B conveyed from an intermediate portion of the main line L1 to the sub line is conveyed by body conveyor means G to above the setting area K2, and then is lowered for setting the front and rear assemblies X1 and X2, oil tank, exhaust pipe, silencer, electric cables or the like thereto. In the above operations, when the body B is being lowered, the front assembly X1 is moved back and forth relative to the pallet P so as to avoid mutual contact interference between the body side members and the front assembly X1.

A reference numeral 43 denotes a relay moving member moving back and forth along the guide 44 in order to convey the body B transported from the main line L1 to the starting end of the body conveyor means G.

Figure 13:
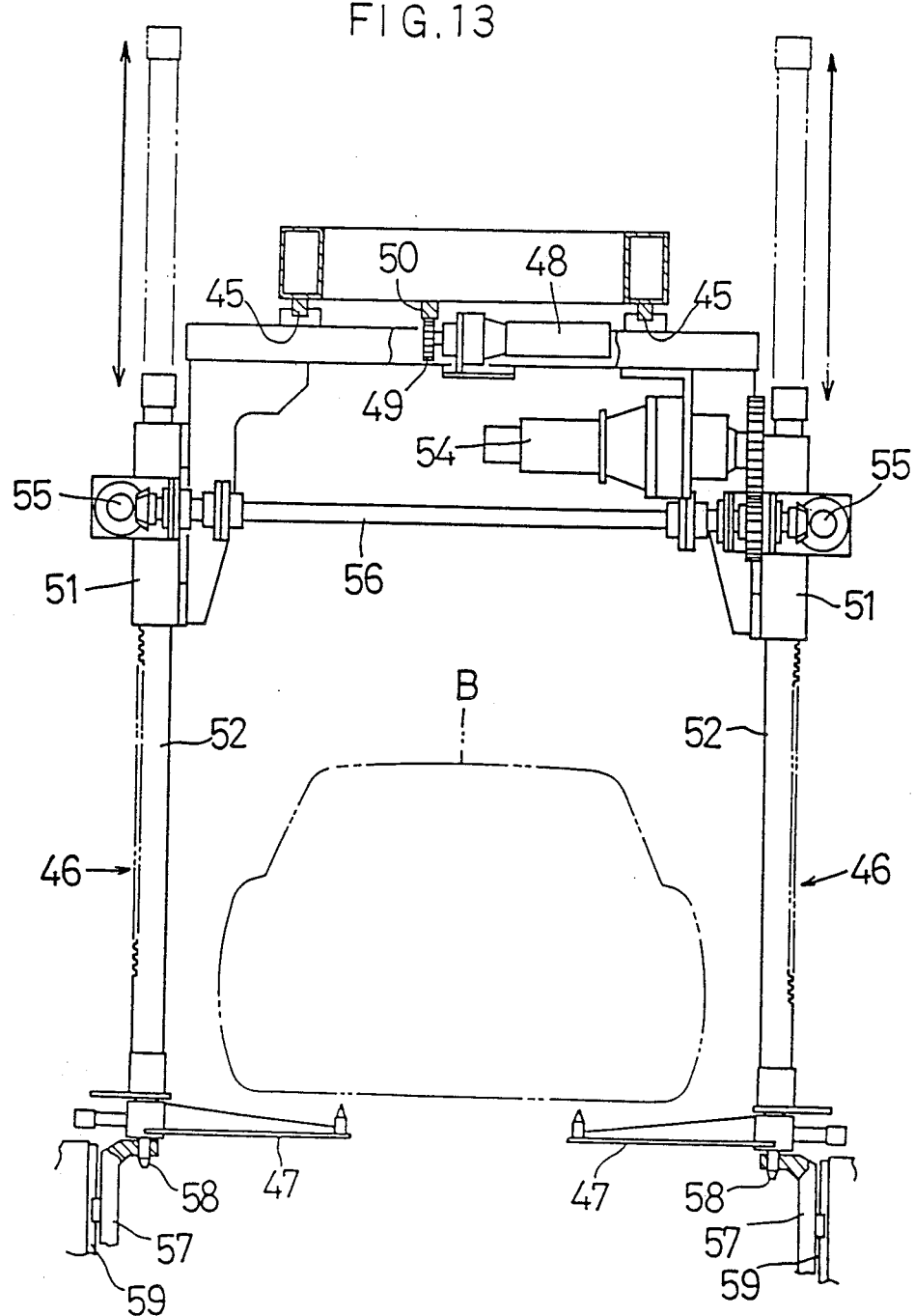
FIG. 13 is a front view of a body conveyor means.
Figure 14:
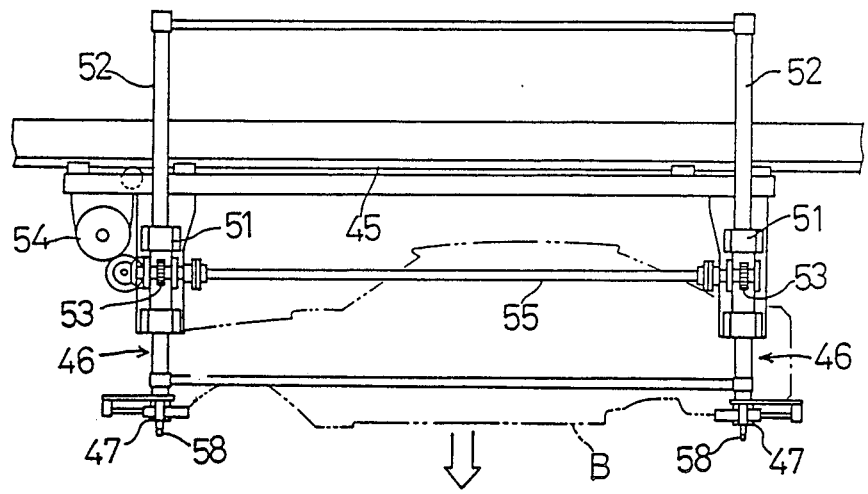
FIG. 14 is a side view of the body conveyor means of FIG. 13.

The body conveyor means G, as shown in FIGS. 13 and 14, comprises an overhead type conveyor including a carrier 46 travelling along a right and left pair of overhead guide rails 45 while hanging the body.

The carrier 46 includes a right and left pair of square-shaped hanger frames 46a, front and rear ends of which a body stopper frame 47 is attached while being pivotable about a vertical axis so as to project or recede therefrom. Incidentally, this pivotal operation of the body stopper frame 47 is effected by means of an air cylinder.

The carrier 46 further includes a pinion 49 driven by a propelling electric motor 48, the pinion 49 coming into engagement with a rack 50 attached to the guide rail 45 for propelling the carrier along the rail.

Each of the right and left pair of hanger frames 46a is slidably supported by a carrier-body-side support 51 and forms a rack 52 at a frame portion thereof vertically extending along the frame. On the other hand, the support 51 includes a pinion 53 which comes into engagement with the rack 52 of the frame 46a. Accordingly, the pair of hanger frames 46a may be lifted up and down by rotating the pinion 53 in the normal and reverse directions.

Figure 15:
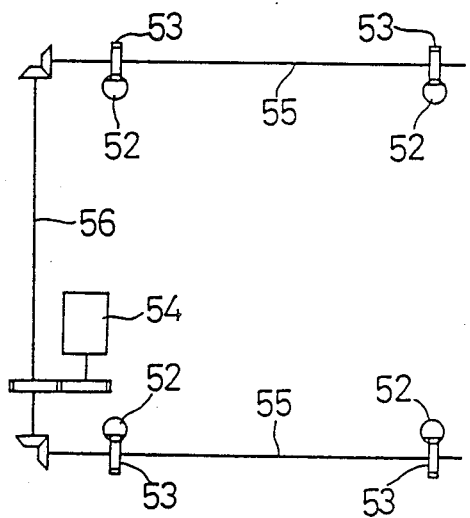
FIG. 15 is a schematic plane view showing a power-transmission system.

As shown schematically in FIG. 15 also, the pinions 53 four in total are all driven by a single lifting electric motor 54.

More specifically, the forward and rearward pair of pinions 53 at the left side and the forward and rearward pair of pinions 53 on the right side are operatively connected with each other so as to be driven in unison by a right and left pair of transmission shafts 55, with the shafts 55 being operatively interconnected via bevel gears by a drive shaft 56 which is gear-connected with the lifting motor 54.

Reference numeral 57 in FIG. 13 denotes holder elements for centering the hanger frames 46a, the holder elements being freely engageable with and disengageable from engaging pins 58 attached to the lower ends of the hanger frames 46a and also being liftable along guides 59 disposed on the ground. Further, the holder elements 57 are normally urged upwards, and the same are lowered when being depressed by an air cylinder by an overwhelming force.

Next, the setting processes of the body B will be additionally described with reference mainly to FIGS. 1, 16(a), 16(b) and 16(c). Incidentally, the following describes by way of example a case where a stabilizer 'a' and a piping 'b' of the body side come into contact-interference with the engine of the front assembly X1.

First, the pallet P mounting thereon the front and rear assemblies X1 and X2, oil tank, exhaust pipe, silencer, electric cables or the like is conveyed to the setting area K2, whereas the carrier 46 supporting the body B is also conveyed to above the setting area K2.

Second, after the pallet has been conveyed to the setting area K2, the lock pins 4 for centering the pallet P are switched over to the engaging conditions, the pair of stopper elements 15 of the movable member 14 are also switched over to the engaging conditions, and further the lock pins 12 for the front assembly holding portion H1 are switched over to the releasing conditions.

Third, the lifting electric motor 54 of the carrier 46 is activated to lower the body B. Then, with this lowering movement of the body B, the electric motor 17 for moving the movable member 14 is activated to move the front assembly X1 forwardly and then rearwardly again.

Figure 17:
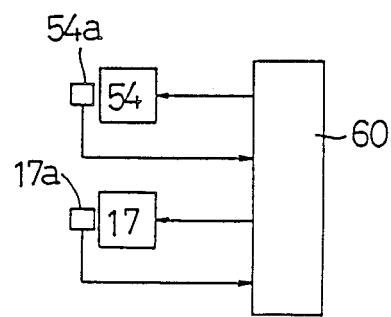
FIG. 17 is a block diagram.

Incidentally, the above forward and rearward movements of the movable member 14 associated with the lowering of the body B are effected by preliminarily setting an object position of the movable member 14 relative to the lowering amount of the body B. More specifically, as shown in FIG. 17, data obtained by the rotary encoder 54a attached to the lifting motor 54 and data obtained by the rotary encoder 17a attached to the motor 17 are inputted to a control device 60 using a microcomputer. Then, the control device 60 controls the operation of the electric motor 17 based on pre-stored data and the above inputted data.

After completion of the setting operations, the body stopping frame 47 of the carrier side is receded to return the carrier to its original position. Also, after the lock pins 12 for the front assembly holding portion H1 are switched over to the engaging conditions, the pair of stopper elements 15 for the movable member 14 are switched over to the releasing conditions. Thereafter, the pallet P is conveyed by the moving members A to the securing area K3.

In the above-described embodiment, in accordance with the wheel-base difference, the holding portion H2 for the rear assembly X2 is positionally adjusted in the forward or rearward direction. Instead, it is also possible to positionally adjust the holding portion H1 for the front assembly. In this case, the securing member holding means 5a and 5b moved in unison with the front assembly holding portion H1 are attached e.g. to the base plate 8 in the previous embodiment. However, as in the previous embodiment, if the front assembly holding portion H1 is moved back and forth by the movable member 14 on the ground side, it will be more convenient to positionally adjust the rear assembly holding portion H2 since this permits the front assembly holding portion H1 to be properly moved back and forth by the movable member 14 regardless of the wheel-base.

An alternate embodiment of the pallet conveyor means will be described next.

Referring now to FIGS. 18 and 19, the pallet conveyor means according to this alternate embodiment mainly includes magnetic floating means A1 for magnetically floating the pallet P and propelling means A2 for propelling the floated pallet P along the line.

Further, there are also provided over the entire length of the line a right and left pair of roller conveyors 32 for receiving and supporting the pallet P when the magnet floating is stopped unintentionally due to a power failure or intentionally at the respective areas K1, K2 and K3.

The magnetic floating means A1 includes a plurality of electromagnets 64 aligned along the line, the electromagnets providing attracting force to the right and left sides of the pallet P. More particularly, this pallet P includes plate-like projections Po at the right and left sides, which right and left projections Po are attracted to the electromagnets 64.

The left and right electromagnets 64 are respectively supported by attaching frames 65 acting as magnetic guides opposed across the line. That is to say, the attaching frames 65 are provided over the entire length of the line while the electromagnets 64 are disposed along the line with an appropriate interdistance therebetween.

Further, a reference numeral 63 denotes supports for the attaching frames 65, the supports being provided along the line with an appropriate interdistance therebetween.

At the front and rear ends and right and left sides of the pallet P, there are provided floating regulator rollers 67 for limiting the floating of the pallet P by coming into contact with the attaching frames 65 and centering rollers 68 for limiting the lateral displacements of the pallet P by coming into contact with the attaching frames 65. Thus, the positioning of the pallet P is regulated by utilizing the attaching frames 65.

A reference numeral 69 denotes gap sensors for detecting the floating position of the pallet P relative to the attaching frames 65. The gap sensors 69 are provided for each of the electromagnets 64. In operation, power supply to the respective electromagnets 64 is controlled based on the detections effected by the gap sensors 69 so as to maintain the contact between the floating regulator rollers 67 and the attaching frames 65.

Figure 20:
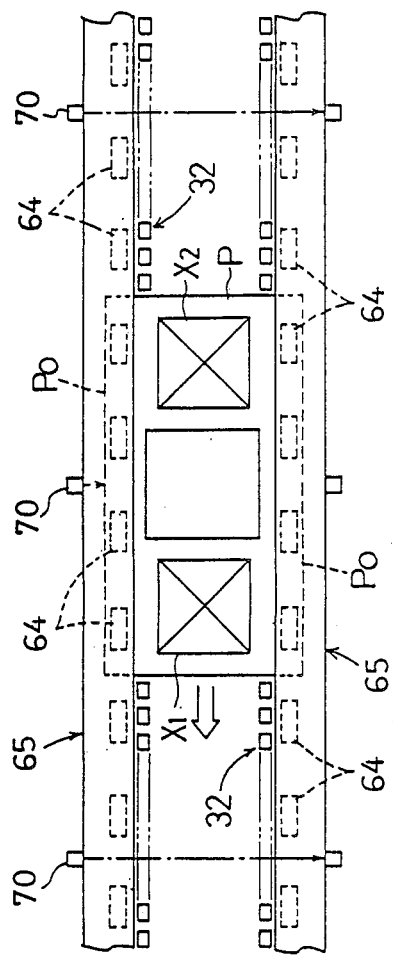
FIG. 20 is a schematic plane view illustrating a conveying condition of the pallet of FIG. 18.

Further, as shown in FIG. 20, with an appropriate interdistance along the line, there are provided photointerruptor type optical sensors 70 operable to detect the pallet P, such that only those electromagnets 64 passed by the pallet P are energized. More particularly, the electromagnet 64 positioned between two optical sensors 70 adjacent each other in the line-longitudinal direction is energized when one of the sensors 70 disposed upstream in the pallet conveying direction detects a passage of pallet P, and the same is disenergized when the other downstream optical sensor 70 detects a passage of the pallet P and then enters its non-detecting condition.

The propelling means A2 is constituted by a linear motor M. That is to say, this linear motor M utilizes the right and left projections Po as its secondary conductor while primary coils 71 are supported by the attaching frames 65.

The primary coils 71 are provided with an appropriate interdistance therebetween along the line. Incidentally the energization and disenergization of the primary coils 71 as is the case with the electromagnets 64 should be controlled based on the detection data obtained by the optical sensors 70.

Figure 21:
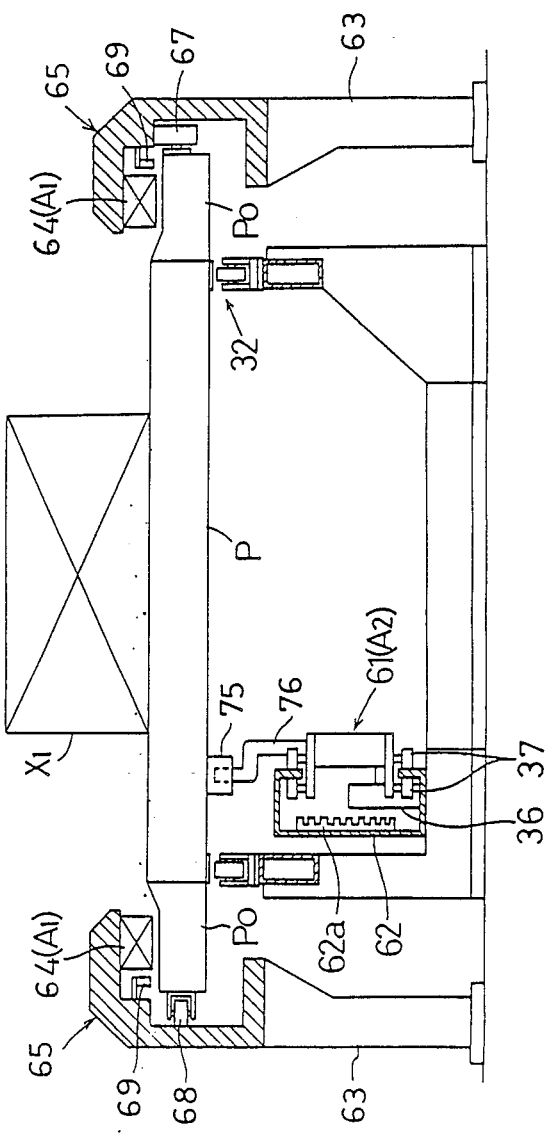
FIG. 21 is a partially cut-out front view showing a conveying condition related to a further embodiment of the pallet.

FIG. 21 shows an alternate embodiment of the propelling means A2. In this embodiment, a moving member 61 for holding and moving the pallet P is disposed between the right and left pair of roller conveyors 32. This moving member 61 travels along a guide 62 having a letter 'C' shaped vertical cross section. The moving member 61 includes as its main components electrically driven travelling wheels 36 and centering rollers 37 for the guide 62 and further includes a stopper hook 76 engageable with a projection 75 attached to a lower side of the pallet P. Also, a power supply rail 62a is attached to an inner face of the guide 62 whereas the moving member 61 includes unillustrated collector elements coming into contact with the power supply rail 62a.

Figure 22:
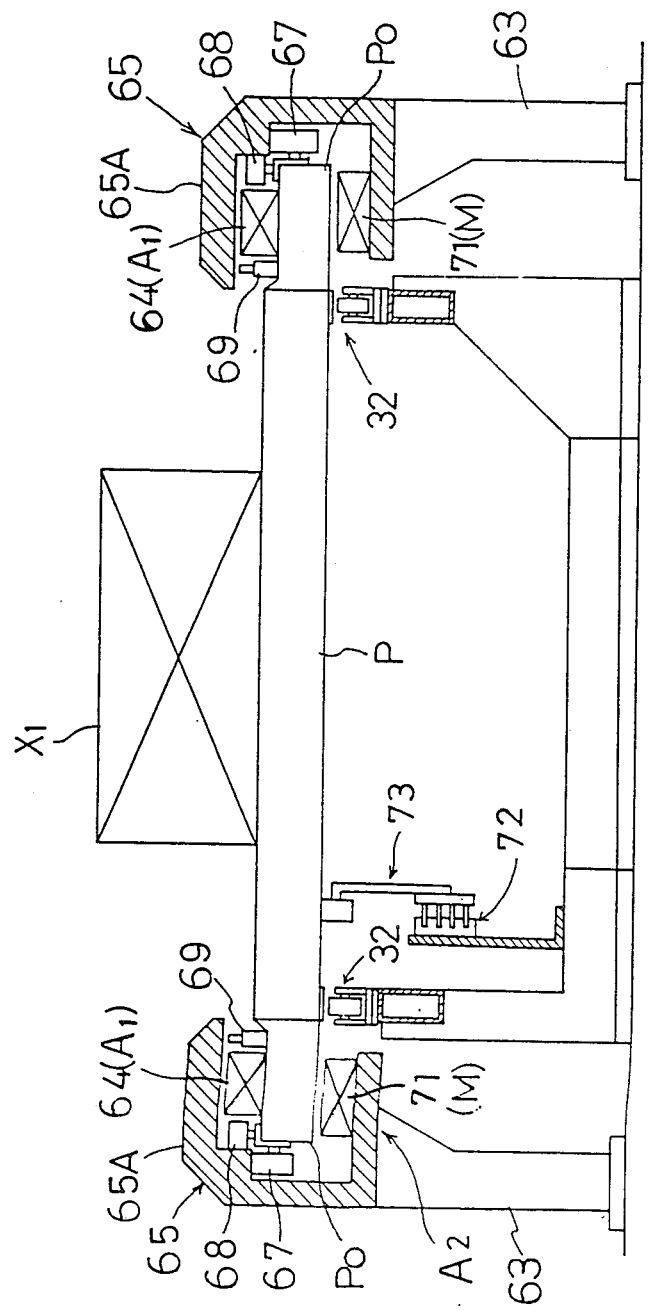
FIG. 22 is a partially cut-out front view showing a conveying condition related to a still further embodiment of the pallet.

FIG. 22 shows an alternate embodiment of the magnetic floating means A1, in which the electromagnets 64 attached to the pallet P magnetically attract an upper portion 65A of the attaching frame 65 acting as a magnetic guide. A reference numeral 72 denotes a power supply rail disposed on the ground and a reference numeral 73 denotes a collector unit attached to the pallet P.

In the foregoing embodiment, the lateral displacements of the pallet P are limited by the centering rollers 68. In place of this, the same effect may be achieved by utilizing a magnetic force. In which case, attracting electromagnets may be attached to the respective attaching frames 65, or permanent magnets may be attached to the pallet P and the attaching frame 65 respectively with poles thereof being opposed to each other.

With the pallet conveyor means having the above-described construction in which the pallet is floated by the magnetic floating means and the floated pallet is conveyed to the setting area where the body and the wheel attaching unit are fixedly secured to each other while the holding means is operated by the securing means, the following effects may be achieved.

Since the magnetically floated pallet is free from considerable resistance against its movement in the conveying direction, it becomes possible to reduce loads acting on the guide means and the pallet when the inclination of the pallet in the conveying direction is restricted by the guide means for regulating the width-wise displacements of the pallet. As the result, deformation of the pallet may be advantageously avoided, and aging or wearing resulting from an extended use of the guide means may be also avoided.

That is to say, in case e.g. the holding/moving means is employed as propelling means so as to avoid any inconvenience in the securing operations carried out in the setting area, even if a width-wise end of the pallet is held and moved by the holding/moving means, it is possible to avoid deteriorations in the use-life of the pallet and conveying precision.

Accordingly, since the pallet is moved while the same is being floated, occurence of vibration and noises may be restricted. Moreover, the pallet may be reliably moved while avoiding the deterioration of life and conveying precision of the pallet.

Figure 23:
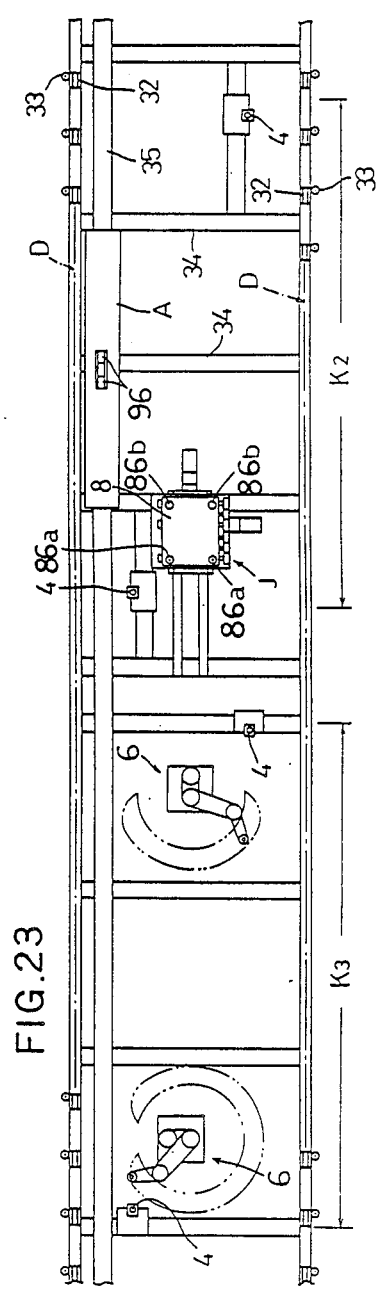
FIG. 23 is a plane view showing portions of the wheel attaching unit assembly line related to a still further embodiment of the present invention.

Furthermore, in order to speedily effect the relative movements between the body and the assemblies in the course of the setting operations with a small force and less vibrations while avoiding any installation cost increase, it is possible to provide assembly moving operational means J in the setting area K2, the operational means J being operable to float up the front assembly X1 from the pallet and then change the position of this floated assembly X1 as shown in FIG. 23.

Figure 25:
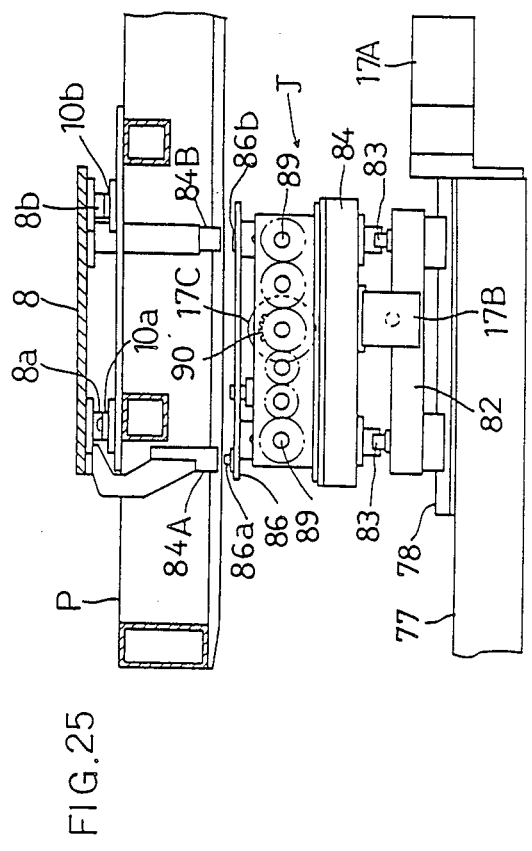
FIG. 25 is a side view of the assembly moving operational means shown in FIG. 24.
Figure 24:
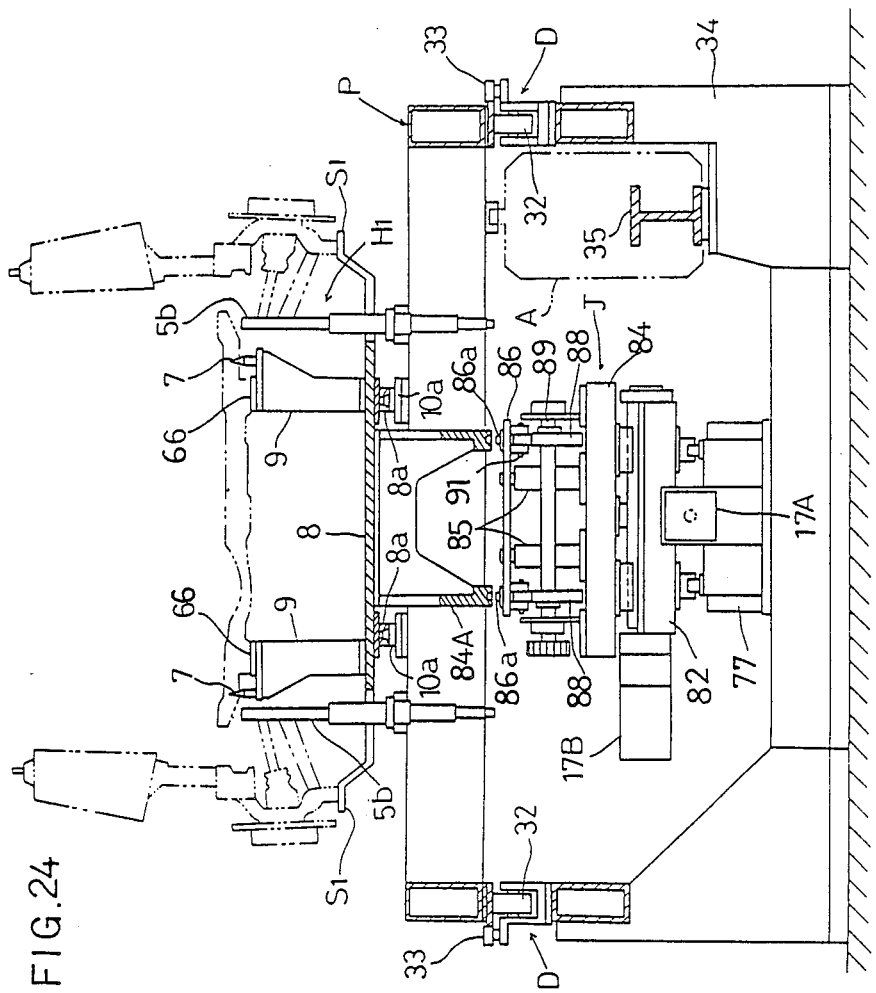
FIG. 24 is a partially cut-out front view of a front assembly holding portion of the embodiment of FIG. 23.

As particularly shown in FIGS. 24 and 25, this assembly moving operational means J includes a forward-rearward moving frame 82 moving back and forth along a right and left pair of guide rails 78 disposed on a base 77, rightward-leftward moving frame 84 moving to the right and left along a front and rear pair of guide rails 83 disposed on the forward-rearward moving frame 82, a vertically-moving frame 86 moving vertically along cylindrical guide rails 85 disposed on the rightward-leftward frame 84, first support elements 86a attached to a front portion of the vertically-moving frame 86 and having a right and left pair of projections and second support elements 86b attached to a rear portion of the vertically-moving frame 86. In operation, the operational means J is operable to move the position of the front assembly holding portion H1 vertically, longitudinally and laterally while receiving and supporting by its first and second support elements 86a and 86b a first leg 84A attached to a front portion of the base plate 8 and having an engaging concave portion and a second leg 84B attached to a rear portion of the plate 8, respectively.

Incidentally, the first and second legs 84A and 84B extend through an inner free space of the pallet with its longitudinal and lateral movements being permitted.

Also, the forward-rearward moving frame 82 includes a dowel-like element engageable with a screw shaft driven by the first electric motor 17A attached to the base 77, such that the frame 82 may be slided back and forth with normal and reverse rotations of the first electric motor 17A.

Similarly, the rightward-leftward moving frame 84 includes a dowel-like element engageable with a screw shaft driven by the second electric motor 17B attached to the forward-rearward moving frame 82, such that the frame 82 may be slided to the right and left with normal and reverse rotations of the second electric motor 17B.

On the other hand, the verticaly-moving frame 86 is lifted up and down with rotations of eccentric rotary members 88 provided at four portions of the rightward-leftward moving frame 84. The left pair of rotary members 88 and the right pair of the same are respectively fitted on a right and left pair of rotary shafts 89 which are operatively connected via a gear transmission mechanism to a drive gear 90 driven in the normal and reverse directions by the third electric motor 17C.

Further, the vertically-moving frame 86 includes rotary elements 91 coming into contact and cooperative with the eccentric rotary members 88.

Figure 27:
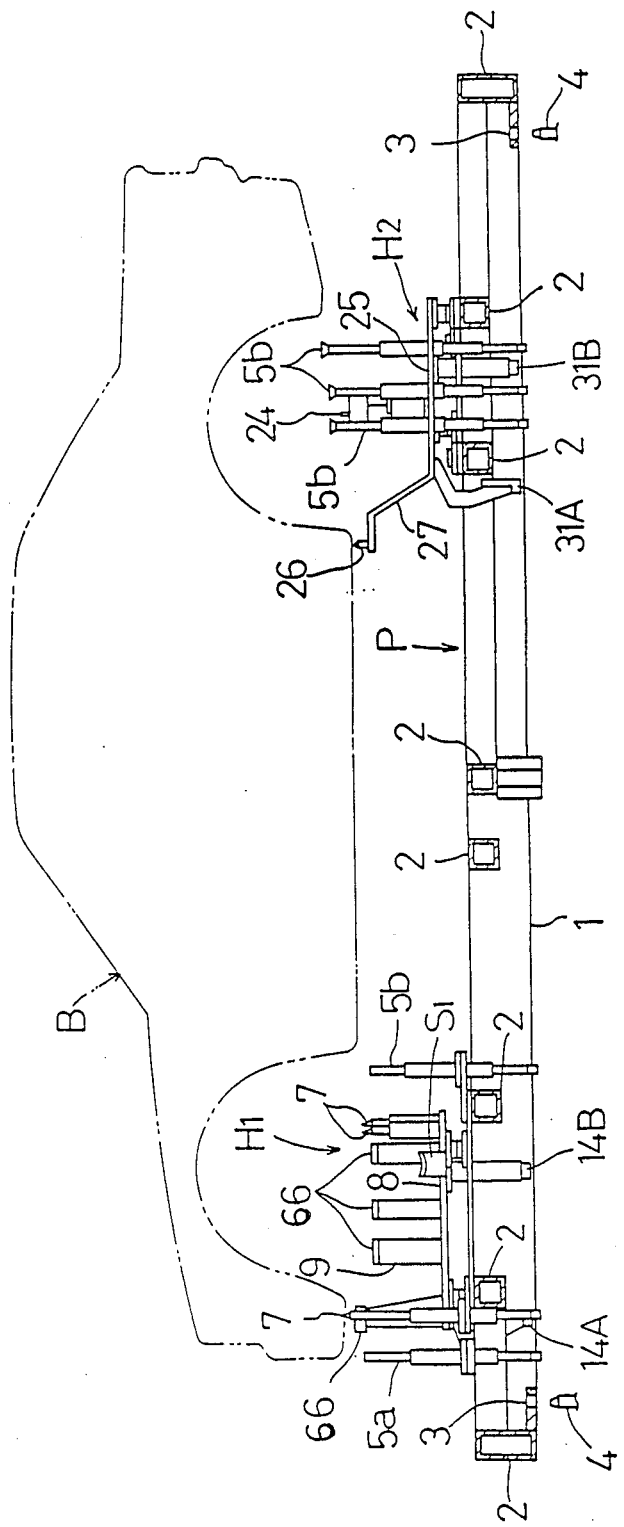
FIG. 27 is a side view of the pallet of FIG. 26.

Also, as shown in FIGS. 25 through 27, the base plate 8 continuously forms receiving elements S1 for receiving the support brackets of the front wheel portions.

In operation, with the upward movement of the base plate 8 away from the pallet P, the fixed positioning of the pallet P is released. Accordingly, the forward-rearward and rightward-leftward positions of the front assembly holding portion H1 may be freely changed while the same is moved up away from the pallet P. More particularly, the pallet P includes a right and left pair of first receiving elements 10a with engaging projections and a right and left pair of second receiving elements 10b disposed rearwardly of the first receiving elements; whereas, the base plate 8 includes first elements 8a with engaging concaves corresponding to the projections of the first receiving elements 10a and second elements 8b with engaging concaves corresponding to the projections of the second receiving elements 10b.

In order to cope with the problem of different wheelbases, the positionally adjustable attaching construction of the rear assembly holding portion H2 to the pallet P may be alternatively provided as follows.

Figure 28:
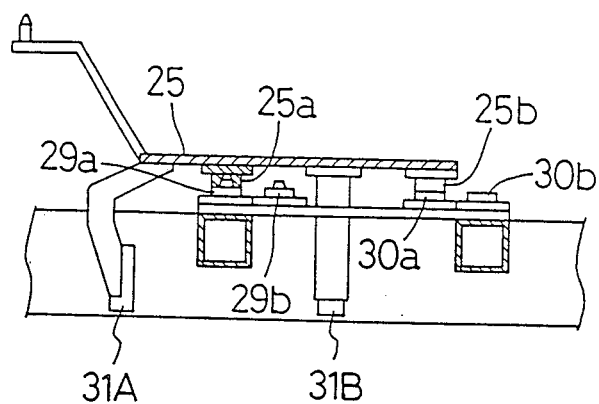
FIG. 28 is a side view of a pallet attaching portion of a rear assembly holding portion of this embodiment.

Referring now to FIG. 28, the pallet P includes at a front portion thereof a right and left pair of receiving elements 29a with engaging projections and at a rear portion thereof a right and left pair of receiving elements 29b. The pallet P further includes at a front portion thereof a right and left pair of receiving elements 30a and a rear portion thereof a right and left pair of receiving elements 30b. On the other hand, the base plate member 25, which is a holder portion side member, includes elements 25a with engaging concaves corresponding to the projections of the forward and rearward pair of receiving elements 29a and 29b and receiving elements 25b corresponding to the forward and rearward pair of receiving elements 30a and 30b.

With the above-described construction, the rear assembly holding portion H2 is released from its fixed position to be floated away from the pallet P. Then, after the holding portion H2 is adjusted in the forward and rearward position thereof, the same is again lowered and fixedly positioned. Thus, the forward and rearward position of the holding portion H2 is adjusted in the two steps.

Incidentally, the above forward-rearward position adjustments are carried out at the pallet adjusting area K4. That is, though not shown, at this pallet adjusting area K4, there is provided holding portion operational means equivalent to the assembly moving operational means J, by which the up-down and forward-rearward movements of the rear assembly holding portion H2 are effected by using the first leg 31A attached to the base plate member 25 and having the engaging concaves and the second leg 31B.

Needless to say, this holding portion moving operational means provided at the pallet adjusting area K4 does not need the function for effecting the lateral movements.

As described hereinbefore, the moving member A travels along the guide 35 having a letter 'I' shaped cross section and has at an upper portion thereof a pair of stopper elements 96 for stopping the pallet P.

Figure 29:
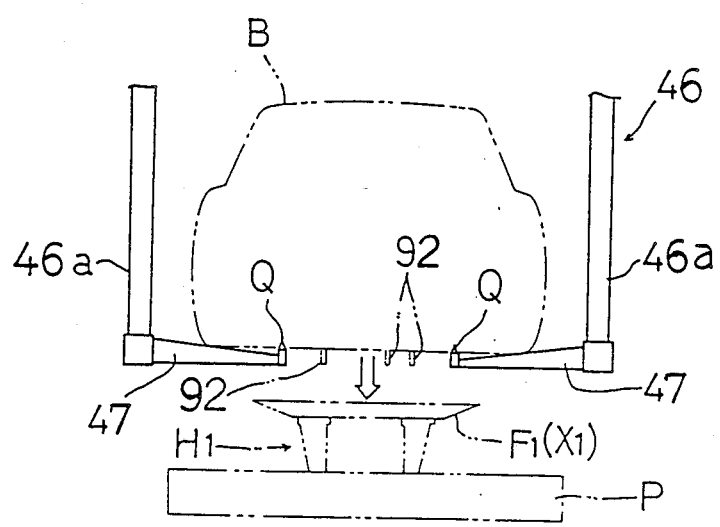
FIG. 29 is a front view of a carrier employed in this embodiment.

The setting operations between the body B and the front and rear assemblies X1 and X2 may be alternatively carried out as follows. That is, as shown in FIG. 27 and FIG. 29, the cylindrical members 26 acting as a right and left pair of engaging pins and formed continuously with the rear assembly holding portion H2 of the pallet P are brought into engagement with unillustrated engaging holes defined in the body. Also, three securing bolts 92 attached to the front end of the body B are engaged with unillustrated engaging holes defined in the base frame F1 of the front assembly X1. The body includes the securing bolts at the front and alone and the same includes securing nuts at other portions thereof.

In this case, the body conveyor means G, as shown in FIG. 29, comprises an overhead type conveyor having the carrier 46 travelling along the overhead guide rails while hanging the body B.

The carrier 46 includes the right and left pair of square-shaped hanger frames 46a, front and rear ends of which body stopper frames 47 are attached while being pivotable about vertical axes so as to project or recede therefrom. Incidentally, these pivotal operations of the body stopper frames 47 are effected by means of air cylinders. The carrier 46 further includes at leading edges thereof pins Q engageable with the body B. Next, the setting operations of the body B in this embodiment will be detailed with reference particularly to FIGS. 30(a), 30(b), 30(c), 30(d), 30(e) and FIG. 1.

In the example case illustrated in these drawings; it is to be noted, the mutual contact interference between the stabilizer 'a' or the piping 'b' of the body and the engine of the front assembly X2 is avoided by moving the rear assembly X2 in the forward tne rearward directions. Incidentally, though not shown, if the rear assembly K2 needs to be moved to the right and left in order to avoid mutual contact interferences between the other elements of the front assembly X1 and the elements of the body, the front assembly X1 needs to be moved to the right and left as well. However, the following description concerns only the case where the front assembly X1 needs to be moved back and forth.

First, the pallet P mounting thereon the front and rear assemblies XI and X2 and so on is conveyed to the setting area K2, whereas the carrier 46 supporting the body B is also conveyed to above the setting area K2.

Figure 30:
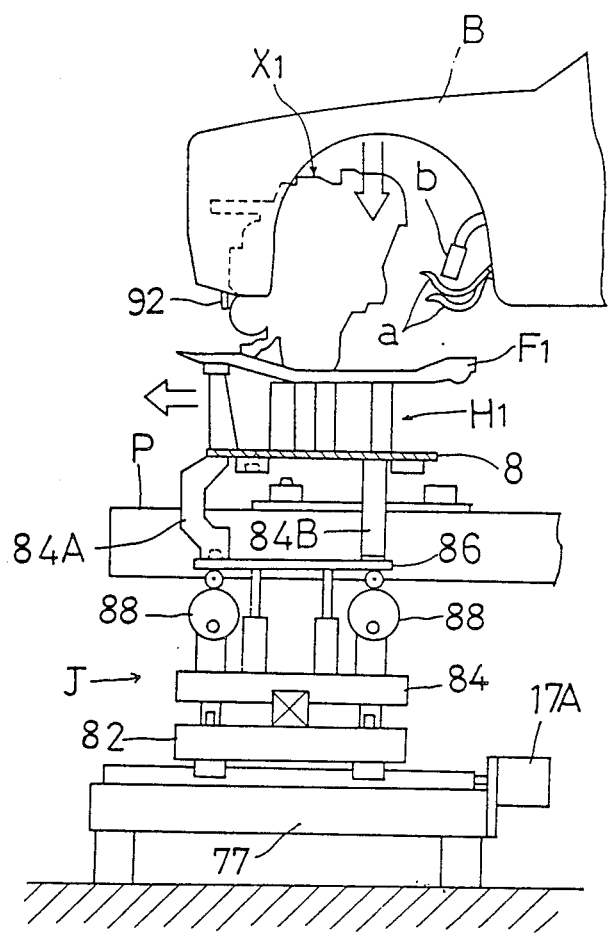
FIGS. 30(a) through 30(e) are schematic side views illustrating setting operations of this embodiment respectively.

Second, after the pallet has been conveyed to the setting area K2, the lock pins 4 for centering the pallet P are switched over to the engaging conditions (see FIG. 30(a)). Next, the front assembly X1 is moved upwards by the assembly moving operational means J while the hanger frame 46a of the carier 46 is lowered to move the body B downwards (see FIG. 30(b)).

Further, with the downward movement of the body B, the front assemby X1 is moved forwardly (see FIG. 30(c)).

Then, the front assembly X1 is again moved to the rearwards (see FIG. 30(d)).

Thereafter, the front assembly X1 is lowered onto the pallet P and also the body B is lowered whereby the setting operations are completed (see FIG. 30(e)).

Incidentally, after the completion of the setting operations, the body stopper frame 47 of the carrier is receded thereby returning the carrier to its original position. Then, after the pallet-centering lock pins 4 are switched over to the releasing conditions, the pallet P is conveyed by the moving members A to the securing area K3.

Also, it is to be noted, the operations of the respective electric motors 17A, 17B and 17C for the assembly moving operational means J associated with the lowering movement of the body B are effected by activating the motors to an object position predetermined in accordance with the lowering position of the body B. More particularly, data obtained by unillustrated detecting means operative to detect the lowering position of the body B and data obtained by rotary encoders attached to the respective motors 17A, 17B and 17C are inputted to a control device using a microcomputer. Then, this control device controls the operations of these electric motors 17A, 17B and 17C based on pre-stored data and the above inputted data.

It is to be noted here that the present invention may be embodied not only in an assembly line of automobiles but also in assembly lines of other kinds of vehicles.

In place of carrying out the setting operations by lowering the body B, it is also possible to carry out the same by lifting up the front assembly X1. In this case, the assembly moving operational means J is adapted to have a longer vertical stroke.

Further, the setting operations are also possible by mounting the assembly X1 directly on the pallet P.

In the previous embodiment, the assembly moving operational means J includes the support arms projected towards the outer side of the pallet P. In place of this, the specific construction of the operational means J may be conveniently modified. For example, it is possible to adapt the operational means J to effect only either of the forward-rearward movement and the rightward-leftward movement. However, as in the above-described embodiments, the operational means J should be positioned within the movable range of the pallet P when seen in a plane view so that the entire installation may be formed compact.

With the above-described characterizing features of the present invention, the following effects may be advantageously achieved.

First, the mutual contact interference between the body side and the assembly side in the course of setting operations is avoided by horizontally moving the assembly which is lighter than the body and the entire pallet. Thus, only a small operating force is needed for achieving this effect. Moreover, this feature achieves not only decrease in the generation of vibrations but also speedy operation. As the result, these effects together with achieve improvement in the assembly operation efficiency as the whole.

Second, if it is predetermined that the setting is always carried out by lowering the body, it becomes possible to mount in advance on the pallet those parts and elements which need not be horizontally moved and to set these parts and elements at one time to the body with the lowering movement of the body. This arrangement is particularly useful when a great number of parts need to be set to the body.

Third, with the present invention, when the specification of the assemblies are changed, the same pallet may be used with only modifying the holding portion. Or, if a plurality of units and parts of different types are to be assembled on the same assembly line, the pallet per se may be of only one type if a plurality of kinds of holding portions for the different types of units are prepared and one of the same suited for the particular unit is selectively used. In short, the present invention may provide a flexible assembly line through co-use of a single type of pallet for different types of assembly units.

In embodying the present invention, it is possible to cause the pallet P to hold other wheel attaching parts and elements than those described in the foregoing embodiments and to set these elements to the body B as well.

Further, the present invention is applicable not only to the front engine mount type vehicle but also to the mid engine mount type and rear engine mount type vehicles.

Also, the specific constructions of the respective components such as the pallet P, the pallet conveyor means A and D and of the body conveyor means G may be conveniently varied depending on the necessity and the object.

What is claimed is:

1. An apparatus for assembling a wheel attaching unit for use in a vehicle assembly line, comprising:

a pallet capable of mounting at predetermined positions thereof a front assembly including a front wheel attaching unit and a rear assembly including a rear wheel attaching unit;

a pallet conveyor means for conveying said pallet through a setting area and a securing area of said front and rear units and a body; and a body conveyor means for conveying said body to a position above said setting area and for lowering said body to set said front and rear assemblies to the body;

wherein said pallet includes a holding portion for at least one of said front assembly and said rear assembly, with said holding portion being positionally adjustable in forward and rearward directions thereof, said pallet further including securing member holding means for holding a securing member for fixedly positioning said at least one of said front and said rear assembly relative to said body, said securing member holding means for said front assembly or rear assembly supported by said holding portion positionally adjustable in the forward and rearward directions being movable into a position corresponding to the secured position of said assembly relative to said pallet.

2. An apparatus as set forth in claim 1, wherein said securing member holding means is attached to a holder member movable together with said holding portion.

3. An apparatus as set forth in claim 1, wherein said pallet conveyor means respectively include magnetic floating means for magnetically floating up said pallet and propelling means for propelling said pallet in a pallet conveying direction, said securing member holding means for holding the securing member for fixedly positioning said front and rear assemblies relative to said body being attached to said pallet, securing means positioned downwardly of said pallet and engageable with said securing member holding means being provided at said securing area.

4. An apparatus as set forth in claim 3, wherein said magnetic floating means includes an array of electromagnets for applying an attracting force onto said pallet from below the pallet.

5. An apparatus as set forth in claim 3, wherein said magnetic floating means includes an array of electromagnets for applying an attracting force onto said pallet from above the pallet.

6. An apparatus as set forth in claim 3, wherein said propelling means comprises a linear motor.

7. An apparatus as set forth in claim 3, wherein said propelling means includes a moving member for engageably moving said pallet.

8. An apparatus as set forth in claim 1, wherein assembly moving operational means is provided at said setting area for lifting up said front assembly from said pallet and for varying a horizontal position of said lifted up assembly.

9. An apparatus as set forth in claim 8, wherein said assembly moving operational means is further operable to lift up said front assembly for returning said front assembly onto said pallet.

10. An apparatus as set forth in claim 8, wherein said pallet includes a holding portion for holding and fixedly positioning said front assembly, said holding portion being supported and fixedly positioned by said pallet, said holding portion being moved in a controlled manner by said assembly moving operational means.

11. An apparatus for assembling a wheel attaching unit for use in a vehicle assembly line, comprising:

a pallet capable of mounting at predetermined positions thereof a front assembly including a front wheel attaching unit and a rear assembly including a rear wheel attaching unit;

a pallet conveyor means for conveying said pallet through a setting area and a securing area of said front and rear units and a body; and a body conveyor means for conveying said body to a position above said setting area and for lowering said body to set said front and rear assemblies to the body;

wherein said pallet includes a holding portion for at least one of said front assembly and said rear assembly, with said holding position being positionally adjustable in forward and rearward directions thereof, said pallet conveyor means respectively include magnetic floating means for magnetically floating up said pallet and propelling means for propelling said pallet in a pallet conveying direction, said securing member holding means for holding the securing member for fixedly positioning said front and rear assemblies relative to said body being attached to said pallet, securing means positioned downwardly of said pallet and engageable with said securing member holding means being provided at said securing area.

12. An apparatus as set forth in claim 11, wherein said securing member holding means is attached to a holder member movable together with said holding portion.

13. An apparatus as set forth in claim 11, wherein said magnetic floating means includes an array of electromagnets for applying an attracting force onto said pallet from below the pallet.

14. An apparatus as set forth in claim 11, wherein said magnetic floating means includes an array of electromagnets for applying an attracting force onto said pallet from above the pallet.

15. An apparatus as set forth in claim 11, wherein said propelling means comprises a linear motor.

16. An apparatus as set forth in claim 11, wherein said propelling means includes a moving member for engageably moving said pallet.

17. An apparatus as set forth in claim 11, wherein assembly moving operational means is provided at said setting area for lifting up said front assembly from said pallet and for varying a horizontal position of said lifted-up assembly.

18. An apparatus as set forth in claim 17, wherein said assembly moving operational means is further operable to lift up said front assembly for returning said front assembly onto said pallet.

19. An apparatus as set forth in claim 17, wherein said pallet includes a holding portion for holding and fixedly positioning said front assembly, said holding portion being supported and fixedly positioned by said pallet, said holding portion being moved in a controlled manner by said assembly moving operational means.

* * * * *